United States Patent
Sun et al.

(10) Patent No.: US 10,257,848 B2
(45) Date of Patent: Apr. 9, 2019

(54) DIRECTIONAL CHANNEL RESERVATION FOR TIME-DIVISION MULTIPLEXING DOWNLINK AND UPLINK DATA BURST TRANSMISSION

(71) Applicant: QUALCOMM Incorporated, San Diego, CA (US)

(72) Inventors: Jing Sun, San Diego, CA (US); Tao Luo, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 15/482,511

(22) Filed: Apr. 7, 2017

(65) Prior Publication Data

US 2018/0098335 A1    Apr. 5, 2018

Related U.S. Application Data

(60) Provisional application No. 62/404,162, filed on Oct. 4, 2016.

(51) Int. Cl.
*H04W 4/00* (2018.01)
*H04W 72/12* (2009.01)
(Continued)

(52) U.S. Cl.
CPC ........ *H04W 72/121* (2013.01); *H04B 7/0417* (2013.01); *H04B 7/0491* (2013.01);
(Continued)

(58) Field of Classification Search
CPC ...... H04B 7/0417; H04B 7/0491; H04B 7/06; H04B 7/0617; H04B 7/26; H04B 7/2687;
(Continued)

(56) References Cited

U.S. PATENT DOCUMENTS 7,035,652 B1   4/2006 Kelkar
8,095,069 B2 * 1/2012 Maltsev ................. H01Q 3/26
                                                             455/41.2
(Continued)

FOREIGN PATENT DOCUMENTS

WO    WO-2011037713 A2    3/2011

OTHER PUBLICATIONS

Huawei et al., "Numerology and Frame Structure for NR-Unlicensed," 3GPP TSG RAN WG1 Meeting #86, R1-167218, Gothenburg, Sweden, Aug. 22-26, 2016, 5 pgs., XP051140586, 3rd Generation Partnership Project.
ISA/EP, International Search Report and Written Opinion of the International Searching Authority, Int'l Application No. PCT/US2017/045615, Oct. 27, 2017, European Patent Office, Rijswijk, NL, 17 pgs.

(Continued)

*Primary Examiner* — Frank Duong
(74) *Attorney, Agent, or Firm* — Holland & Hart LLP

(57) ABSTRACT

Methods, systems, and devices for wireless communication are described. A base station may communicate with multiple user equipments (UEs) in a wireless system supporting directional transmission in shared spectrum (e.g., in millimeter wave (mmW) spectrum). The base station may contend for the channel (e.g., using a listen-before-talk (LBT) procedure) and, upon success, transmit a directional channel reservation (CR) signal to each of the multiple UEs. The CR signal may reserve the channel for a specific time period and indicate a start time, an end time, or both. The UE may respond with another CR transmission. In some examples, the base station may transmit CR signals to each of the UEs in a single burst transmission. In other examples, the base station may transmit CR signals to the UEs sequentially, so that if a UE does not respond, the reserved time may be allotted to another UE.

28 Claims, 20 Drawing Sheets

(51) Int. Cl.
  *H04W 16/28* (2009.01)
  *H04B 7/06* (2006.01)
  *H04Q 11/04* (2006.01)
  *H04B 7/0417* (2017.01)
  *H04W 74/00* (2009.01)
  *H04W 72/04* (2009.01)
  *H04B 7/0491* (2017.01)
  *H04B 7/26* (2006.01)

(52) U.S. Cl.
  CPC ......... *H04B 7/0617* (2013.01); *H04B 7/2687* (2013.01); *H04Q 11/04* (2013.01); *H04W 16/28* (2013.01); *H04W 72/042* (2013.01); *H04W 72/1273* (2013.01); *H04W 72/1289* (2013.01); *H04W 74/006* (2013.01); *H04W 74/008* (2013.01)

(58) Field of Classification Search
  CPC ...... H04Q 11/04; H04W 16/28; H04W 72/04; H04W 72/042; H04W 72/121; H04W 72/1273; H04W 72/1289; H04W 74/006; H04W 74/008
  See application file for complete search history.

(56) References Cited

U.S. PATENT DOCUMENTS

| | | | |
|---|---|---|---|
| 8,611,940 B2 | 12/2013 | Jain et al. | |
| 8,730,873 B2* | 5/2014 | Nikula | H04B 7/086 370/252 |
| 8,737,321 B2 | 5/2014 | Ribeiro et al. | |
| 8,842,606 B2 | 9/2014 | Denteneer et al. | |
| 9,107,221 B2* | 8/2015 | Cordeiro | H04W 74/0816 |
| 2014/0185497 A1 | 7/2014 | Wolf et al. | |
| 2014/0341207 A1* | 11/2014 | Bhushan | H04W 28/0289 370/350 |

OTHER PUBLICATIONS

Qualcomm Incorporated, "Advanced Frame Structure," 3GPP TSG-RAN WG1 Meeting #86bis, R1-1610132, Lisbon, Portugal, Oct. 10-14, 2016, 9 pgs., XP051159935, 3rd Generation Partnership Project.

Zte, "Discussion on NR Operation in Unlicensed Spectrum," 3GPP TSG RAN WG1 Meeting #86bis, R1-1609803, Lisbon, Portugal, Oct. 10-14, 2016, 7 pgs., XP051158589, 3rd Generation Partnership Project.

\* cited by examiner

DIRECTIONAL CHANNEL RESERVATION FOR TIME-DIVISION MULTIPLEXING DOWNLINK AND UPLINK DATA BURST TRANSMISSION

CROSS REFERENCES

The present Application for Patent claims priority to U.S. Provisional Patent Application No. 62/404,162 by Sun, et al., entitled "Directional Channel Reservation for Time-Division Multiplexing Downlink and Uplink Data Burst Transmission," filed Oct. 4, 2016, assigned to the assignee hereof.

BACKGROUND

The following relates generally to wireless communication, and more specifically to directional channel reservation for time-division multiplexing downlink and uplink data burst transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some wireless systems may operate in unlicensed radio frequency (RF) spectrum. Devices operating in unlicensed RF spectrum may perform contention procedures to determine access to the wireless medium. In some cases, however, contention procedures may be based on omni-directional transmission. Devices communicating using directional transmissions (e.g., devices operating in millimeter wave (mmW) spectrum) may experience suboptimal performance when using contention procedures based on omni-directional transmission.

SUMMARY

A base station may communicate with multiple UEs in a wireless system supporting directional transmission in unlicensed spectrum (e.g., in mmW spectrum). The base station may contend for the channel (e.g., using a listen-before-talk (LBT) procedure) and, upon success, transmit a directional channel reservation (CR) signal to one or more of the multiple UEs. The CR signal may reserve the channel for a specified time period, for example, by including a start time of the reservation, an end time of the reservation, or both. The UE may then respond with another CR transmission, for example, to confirm reception of the first CR signal. In some examples, the base station may transmit CR signals to one or more of the UEs in a single burst transmission. In other examples, the base station may transmit CR signals to multiple UEs sequentially, so that if a UE does not respond, the reserved time may be allotted to another UE.

A method of wireless communication is described. The method may include transmitting a first CR signal indicating a first reserved time period to a first UE using a first beam direction in a shared RF spectrum band, transmitting a second CR signal indicating a second reserved time period to a second UE using a second beam direction different from the first beam direction in the shared RF spectrum band, receiving, in response to the first CR signal, a third CR signal indicating the first reserved time period from the first UE using the first beam direction in the shared RF spectrum band, receiving, in response to the second CR signal, a fourth CR signal indicating the second reserved time period from the second UE using the second beam direction in the shared RF spectrum band, communicating with the first UE using the first beam direction in the shared RF spectrum band during the first reserved time period based at least in part on the first CR signal and the third CR signal, and communicating with the second UE using the second beam direction in the shared RF spectrum band during the second reserved time period based at least in part on the second CR signal and the fourth CR signal.

An apparatus for wireless communication is described. The apparatus may include means for transmitting a first CR signal indicating a first reserved time period to a first UE using a first beam direction in a shared RF spectrum band, means for transmitting a second CR signal indicating a second reserved time period to a second UE using a second beam direction different from the first beam direction in the shared RF spectrum band, means for receiving, in response to the first CR signal, a third CR signal indicating the first reserved time period from the first UE using the first beam direction in the shared RF spectrum band, means for receiving, in response to the second CR signal, a fourth CR signal indicating the second reserved time period from the second UE using the second beam direction in the shared RF spectrum band, means for communicating with the first UE using the first beam direction in the shared RF spectrum band during the first reserved time period based at least in part on the first CR signal and the third CR signal, and means for communicating with the second UE using the second beam direction in the shared RF spectrum band during the second reserved time period based at least in part on the second CR signal and the fourth CR signal.

Another apparatus for wireless communication is described. The apparatus may include a processor, memory in electronic communication with the processor, and instructions stored in the memory. The instructions may be operable to cause the processor to transmit a first CR signal indicating a first reserved time period to a first UE using a first beam direction in a shared RF spectrum band, transmit a second CR signal indicating a second reserved time period to a second UE using a second beam direction different from the first beam direction in the shared RF spectrum band, receive, in response to the first CR signal, a third CR signal indicating the first reserved time period from the first UE using the first beam direction in the shared RF spectrum band, receive, in response to the second CR signal, a fourth CR signal indicating the second reserved time period from the second UE using the second beam direction in the shared RF spectrum band, communicate with the first UE using the first beam direction in the shared RF spectrum band during the first reserved time period based at least in part on the first CR signal and the third CR signal, and communicate with the second UE using the second beam direction in the shared RF spectrum band during the second reserved time period based at least in part on the second CR signal and the fourth CR signal.

A non-transitory computer readable medium for wireless communication is described. The non-transitory computer-readable medium may include instructions operable to cause a processor to transmit a first CR signal indicating a first reserved time period to a first UE using a first beam direction in a shared RF spectrum band, transmit a second CR signal indicating a second reserved time period to a second UE using a second beam direction different from the first beam direction in the shared RF spectrum band, receive, in response to the first CR signal, a third CR signal indicating the first reserved time period from the first UE using the first beam direction in the shared RF spectrum band, receive, in response to the second CR signal, a fourth CR signal indicating the second reserved time period from the second UE using the second beam direction in the shared RF spectrum band, communicate with the first UE using the first beam direction in the shared RF spectrum band during the first reserved time period based at least in part on the first CR signal and the third CR signal, and communicate with the second UE using the second beam direction in the shared RF spectrum band during the second reserved time period based at least in part on the second CR signal and the fourth CR signal.

Some examples of the method, apparatus, and non-transitory computer-readable medium described above may further include processes, features, means, or instructions for identifying a first end time of the first reserved time period, where the first CR signal, the third CR signal, or both include an indication of the first end time. Some examples of the method, apparatus, and non-transitory computer-readable medium described above may further include processes, features, means, or instructions for identifying a second end time of the second CR signal, where the second CR signal, the fourth CR signal, or both include an indication of the second end time.

Some examples of the method, apparatus, and non-transitory computer-readable medium described above may further include processes, features, means, or instructions for identifying a first start time of the first reserved time period, where the first CR signal, the third CR signal, or both include an indication of the first start time. Some examples of the method, apparatus, and non-transitory computer-readable medium described above may further include processes, features, means, or instructions for identifying a second start time of the second reserved time period, where the second CR signal, the fourth CR signal, or both include an indication of the second start time, and where the first reserved time period may be non-overlapping with the second reserved time period.

In some examples of the method, apparatus, and non-transitory computer-readable medium described above, the first end time may be different from the second end time and the first reserved time period may be overlapping with the second reserved time period. In some examples of the method, apparatus, and non-transitory computer-readable medium described above, the first end time and the second end time include a same end time and the first reserved time period and the second reserved time period include a same time period. In some examples of the method, apparatus, and non-transitory computer-readable medium described above, the first CR signal and the second CR signal may be transmitted in a same burst before receiving the third CR signal and the fourth CR signal. In some examples of the method, apparatus, and non-transitory computer-readable medium described above, the third CR signal and the fourth CR signal may be received before communicating with the first UE and the second UE.

In some examples of the method, apparatus, and non-transitory computer-readable medium described above, the third CR signal may be received before transmitting the second CR signal, where transmitting the second CR signal may be based at least in part on the third CR signal. In some examples of the method, apparatus, and non-transitory computer-readable medium described above, the fourth CR signal may be received before communicating with the first UE and the second UE.

Some examples of the method, apparatus, and non-transitory computer-readable medium described above may further include processes, features, means, or instructions for transmitting a fifth CR signal indicating the second reserved time period to a third UE before transmitting the second CR signal. Some examples of the method, apparatus, and non-transitory computer-readable medium described above may further include processes, features, means, or instructions for determining that a response to the fifth CR signal was not received during a designated time period, where transmitting the second CR signal may be based at least in part on the determination.

In some examples of the method, apparatus, and non-transitory computer-readable medium described above, the third CR signal may be received before transmitting the fifth CR signal. In some examples of the method, apparatus, and non-transitory computer-readable medium described above, the fifth CR signal may be transmitted in a same burst as the first CR signal before receiving the third CR signal.

Some examples of the method, apparatus, and non-transitory computer-readable medium described above may further include processes, features, means, or instructions for transmitting a resource grant for a downlink transmission to the first UE, the second UE, or both, where communicating with the first UE, the second UE, or both includes transmitting the downlink transmission using the resource grant, and where the method further includes receiving an acknowledgement from the first UE, the second UE, or both in response to the downlink transmission. In some examples of the method, apparatus, and non-transitory computer-readable medium described above, the first CR signal, the second CR signal, or both include a CR transmit signal, and the third CR signal, the fourth CR signal, or both include a CR receive signal.

Some examples of the method, apparatus, and non-transitory computer-readable medium described above may further include processes, features, means, or instructions for transmitting a resource grant for an uplink transmission to the first UE, the second UE, or both. Some examples of the method, apparatus, and non-transitory computer-readable medium described above may further include processes, features, means, or instructions for communicating with the first UE, the second UE, or both includes receiving the uplink transmission based on the resource grant. In some examples of the method, apparatus, and non-transitory computer-readable medium described above, the first CR signal, the second CR signal, or both include a CR receive signal and the third CR signal, the fourth CR signal, or both include a CR transmit signal.

Some examples of the method, apparatus, and non-transitory computer-readable medium described above may further include processes, features, means, or instructions for performing a first directional LBT procedure in the first beam direction, where the first CR signal may be transmitted based at least in part on the first directional LBT procedure. Some examples of the method, apparatus, and non-transitory computer-readable medium described above may further include processes, features, means, or instructions for performing a second directional LBT procedure in the second beam direction, where the second CR signal may be transmitted based at least in part on the second directional LBT procedure.

Some examples of the method, apparatus, and non-transitory computer-readable medium described above may further include processes, features, means, or instructions for transmitting a sixth CR signal to a third UE, where the sixth CR signal indicates a start time of a reserved time period and an end time of the reserved time period, and where the start time may be different from a transmission time of the sixth CR signal. Some examples of the method, apparatus, and non-transitory computer-readable medium described above may further include processes, features, means, or instructions for receiving a seventh CR signal from the third UE in response to the sixth CR signal, where the seventh CR signal indicates the start time and the end time of the reserved time period. Some examples of the method, apparatus, and non-transitory computer-readable medium described above may further include processes, features, means, or instructions for communicating with the third UE in the shared RF spectrum band during the reserved time period based at least in part on the sixth CR signal and the seventh CR signal.

In some examples of the method, apparatus, and non-transitory computer-readable medium described above, the transmitting the sixth CR signal, the receiving the seventh CR signal, the communicating with the third UE in the shared RF spectrum band, or any combination thereof may be based at least in part on directional transmission using a beam direction to or from the third UE.

In some examples of the method, apparatus, and non-transitory computer-readable medium described above, the end time of the reserved time period may be based at least in part on an end time for the communicating with the third UE. In some examples of the method, apparatus, and non-transitory computer-readable medium described above, the end time of the reserved time period may be based at least in part on a time period for a plurality of UEs to communicate with a base station. In some examples of the method, apparatus, and non-transitory computer-readable medium described above, the shared RF spectrum band includes an unlicensed RF spectrum band that includes an mmW spectrum band.

A method of wireless communication is described. The method may include receiving a first CR signal from a base station in a shared RF spectrum band, the first CR signal indicating a reserved time period, transmitting, in response to receiving the first CR signal, a second CR signal indicating the reserved time period to the base station in the shared RF spectrum band, and communicating with the base station in the shared RF spectrum band during the reserved time period, where the communicating is based at least in part on the first CR signal and the second CR signal.

An apparatus for wireless communication is described. The apparatus may include means for receiving a first CR signal from a base station in a shared RF spectrum band, the first CR signal indicating a reserved time period, means for transmitting, in response to receiving the first CR signal, a second CR signal indicating the reserved time period to the base station in the shared RF spectrum band, and means for communicating with the base station in the shared RF spectrum band during the reserved time period, wherein the communicating is based at least in part on the first CR signal and the second CR signal.

Another apparatus for wireless communication is described. The apparatus may include a processor, memory in electronic communication with the processor, and instructions stored in the memory. The instructions may be operable to cause the processor to receive a first CR signal from a base station in a shared RF spectrum band, the first CR signal indicating a reserved time period, transmit, in response to receiving the first CR signal, a second CR signal indicating the reserved time period to the base station in the shared RF spectrum band, and communicate with the base station in the shared RF spectrum band during the reserved time period, where the communicating is based at least in part on the first CR signal and the second CR signal.

A non-transitory computer readable medium for wireless communication is described. The non-transitory computer-readable medium may include instructions operable to cause a processor to receive a first CR signal from a base station in a shared RF spectrum band, the first CR signal indicating a reserved time period, transmit, in response to receiving the first CR signal, a second CR signal indicating the reserved time period to the base station in the shared RF spectrum band, and communicate with the base station in the shared RF spectrum band during the reserved time period, wherein the communicating is based at least in part on the first CR signal and the second CR signal.

In some examples of the method, apparatus, and non-transitory computer-readable medium described above, the receiving the first CR signal, the transmitting the second CR signal, the communicating with the base station, or any combination thereof may be based at least in part on directional transmission using a beam direction to or from the base station. Some examples of the method, apparatus, and non-transitory computer-readable medium described above may further include processes, features, means, or instructions for identifying an end time of the reserved time period based at least in part on the first CR signal, where the first CR signal, the second CR signal, or both include an indication of the end time.

Some examples of the method, apparatus, and non-transitory computer-readable medium described above may further include processes, features, means, or instructions for identifying a start time of the reserved time period different from a transmission time of the first CR signal and a transmission time of the second CR signal, where the start time may be identified based at least in part on the first CR signal, and where the first CR signal, the second CR signal, or both include an indication of the start time.

Some examples of the method, apparatus, and non-transitory computer-readable medium described above may further include processes, features, means, or instructions for receiving a resource grant for a downlink transmission, where communicating with the base station includes receiving the downlink transmission using the resource grant. In some examples of the method, apparatus, and non-transitory computer-readable medium described above, the method further includes transmitting an acknowledgement to the base station in response to the downlink transmission. Some examples of the method, apparatus, and non-transitory computer-readable medium described above may further include processes, features, means, or instructions for receiving a resource grant for an uplink transmission during the reserved time period, where communicating with the base station includes transmitting the uplink transmission using the resource grant.

Some examples of the method, apparatus, and non-transitory computer-readable medium described above may further include processes, features, means, or instructions for transmitting an acknowledgement for the first CR signal together with the second CR signal. Some examples of the method, apparatus, and non-transitory computer-readable medium described above may further include processes, features, means, or instructions for identifying a delay period between receiving the first CR signal and transmitting the second CR signal, where the second CR signal may be transmitted following the delay period.

DETAILED DESCRIPTION

A base station may communicate with multiple UEs in a wireless system supporting directional transmission in unlicensed spectrum (e.g., in mmW spectrum). The base station may transmit downlink information to a UE using a beam in the direction of the UE. If one or more UEs are in a similar direction, the base station may use a common beam for transmission to multiple UEs.

The base station may contend for the channel (e.g., using an LBT procedure) and, when successful, transmit a directional CR signal to each scheduled UE. Thus, the base station may reserve a channel such that neighboring UEs and base stations do not transmit on the channel and introduce interference. The CR signal may reserve the channel for a specified time period, and, in some examples, the CR transmission may include an indication of a start time of the CR period, an end time of the CR period, or both. The base station may also transmit a pre-grant with the CR signal (e.g., before or after the CR signal in the same transmission or, in some examples, during another transmission), which may indicate timing information for the scheduled transmission or CR. Upon receiving the CR transmission (e.g., the pre-grant, the CR signal, etc.) from the base station, the UE may transmit another CR signal and a pre-grant acknowledgment (ACK) to the base station in response. In some examples, the base station may transmit CR signals to multiple UEs or each of the UEs in a single burst transmission. In other examples, the base station may transmit CR signals to the UEs sequentially, so that if a UE does not respond, the reserved time may be allotted to another UE.

If a neighboring UE or base station detects the CR signal, it may refrain from transmitting on the channel during the reserved time period. In some cases, the base station may set the time period to a common length for all of the UEs (e.g., by setting a common end time for each CR time period). In other cases, the base station may set a CR time period to end with the transmission between the base station and the corresponding UE. In other examples, the CR signal may include an indication of a start time and an end time for the CR time period. The CR start time may correspond with the beginning of a transmission for UE. The base station may transmit CR signals to reserve the channel for uplink or downlink transmissions.

Aspects of the disclosure are initially described in the context of a wireless communications system. The wireless communications system may support directional CR signals to reserve a transmission medium for a set time period. A variety of different configurations for directional CR transmission are then described. Aspects of the disclosure are further illustrated by and described with reference to apparatus diagrams, system diagrams, and flowcharts that relate to directional CR for TDM downlink and uplink data burst transmission.

Figure 1:
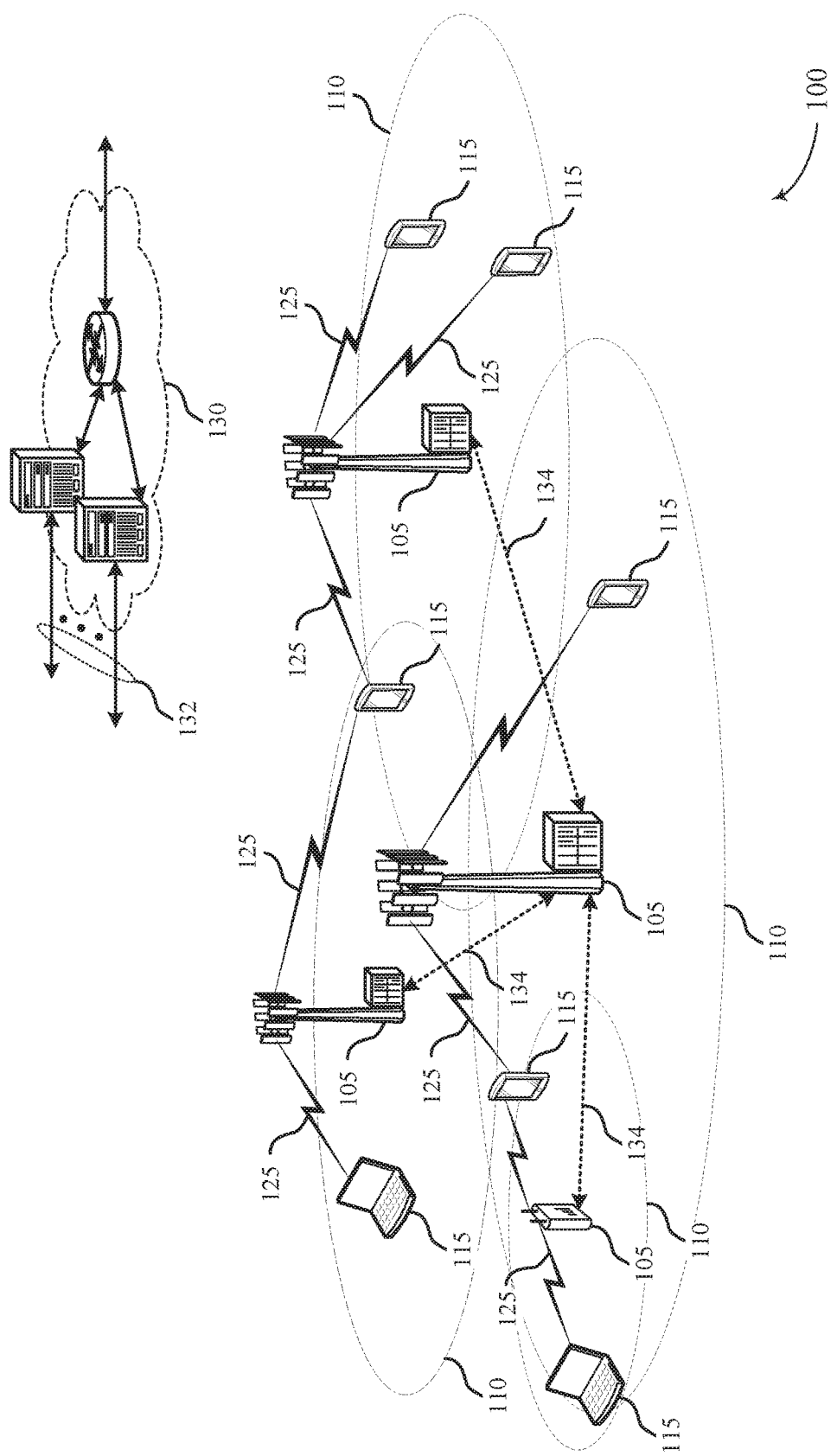
FIG. 1 illustrates an example of a system for wireless communication that supports directional CR for time division multiplexing (TDM) downlink and uplink data burst transmission in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1). Base stations 105 may communicate with one another over backhaul links 134 (e.g., X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communications system 100 may operate in an ultra high frequency (UHF) frequency region using frequency bands from 700 MHz to 2600 MHz (2.6 GHz), although in some cases wireless local area networks (WLANs) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors.

Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support mmW communications between UEs 115 and base stations 105. Devices (e.g., UEs 115 and base station 105) operating in mmW spectrum may have multiple antennas to allow beamforming. That is, a base station 105 may use multiple antennas or antenna arrays to conduct beamforming operations for directional communications with a UE 115. Beamforming (which may also be referred to as spatial filtering) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station) and a receiver (e.g. a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). An mmW receiver (e.g., a UE 115) may utilize multiple beams (e.g., antenna subarrays) while receiving the synchronization or other directional signals.

A base station 105 and a UE 115 may utilize different waveforms based on different multiplexing schemes. For example, orthogonal frequency division multiplexing (OFDM) employs multiple overlapping RF carriers, each operating at a chosen frequency that is orthogonal to the other frequencies to produce a transmission scheme that supports higher bit rates due to parallel channel operation. OFDMA is a multiple access scheme relying on the use of OFDM, where individual subcarriers (or groups of subcarriers) are assigned to distinct users. TDM may include methods of multiplexing different data signals, whereby the channel is divided into multiple time slots and the different signals are mapped to different time slots. Frequency division multiplexing (FDM) may include methods of multiplexing different data signals for transmission on a single communications channel, whereby each signal is assigned a non-overlapping frequency range within the main channel. In a wireless system using beamforming techniques, a base station 105 may transmit to different UEs 115 within a downlink burst on different directional beams.

In some cases, wireless communications system 100 may utilize both licensed and unlicensed RF spectrum bands. For example, wireless communications system 100 may employ LTE License Assisted Access (LTE-LAA) or LTE Unlicensed (LTE U) radio access technology (RAT) in an unlicensed band such as the 5 Ghz Industrial, Scientific, and Medical (ISM) band. When operating in unlicensed RF spectrum bands, wireless devices such as base stations 105 and UEs 115 may employ LBT procedures to ensure the channel is clear before transmitting data. These devices may perform an LBT procedure such as a clear channel assessment (CCA) prior to communicating in order to determine whether the channel is available. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both. If wireless communications system 100 utilizes an unlicensed, mmW RF spectrum band, a base station 105 may reserve a transmission medium by transmitting a directional CR signal to a UE 115. Neighboring UEs 115 or base stations 105 next to the UE 115 may refrain from transmission while the channel is reserved.

Thus, a base station 105 may communicate with multiple UEs 115 in a wireless system supporting directional transmission in unlicensed spectrum. The base station 105 may contend for the channel and transmit a directional CR signal to each of the multiple UEs 115. The CR signal may reserve the channel for a specific time period. The CR transmission may include a start time, an end time, or both. The UE 115 may then respond with another CR transmission. In some examples, the base station 105 may transmit CR signals to each of the UEs 115 in a single burst transmission. In other examples, the base station may transmit CR signals to the UEs 115 sequentially, so that if a UE 115 does not respond the reserved time may be allotted to another UE 115.

Figure 2:
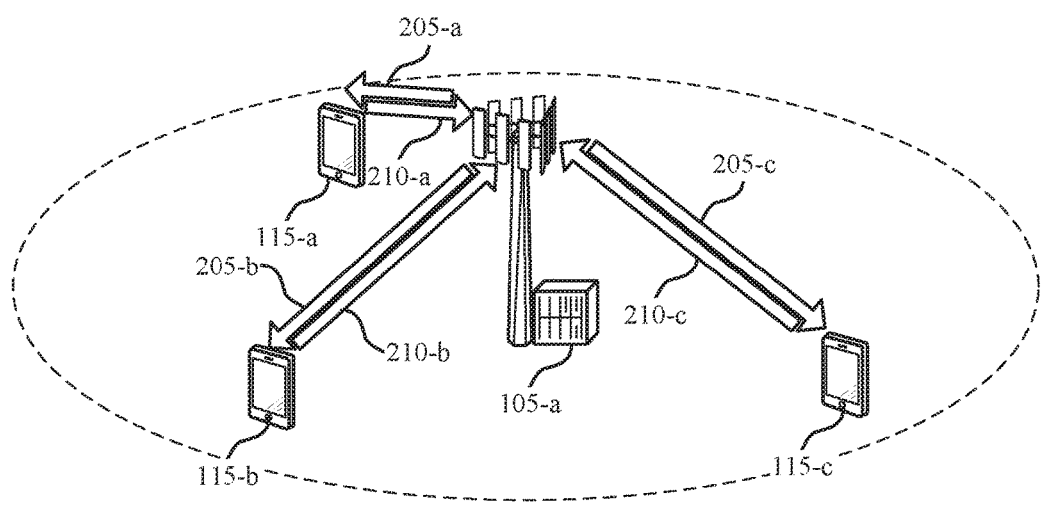
FIG. 2 illustrates an example of a wireless communications system 200 that supports directional CR for TDM downlink and uplink data burst transmission in accordance with aspects of the present disclosure.

FIG. 2 illustrates an example of a wireless communications system 200 for directional CR for TDM downlink and uplink data burst transmission. Wireless communications system 200 may include base station 105-a and UEs 115-a, 115-b, and 115-c, which may be, respectively, examples of a base station 105 and UEs 115 as described in FIG. 1. Base station 105-a may transmit downlink CR signals 205-a, 205-b, and 205-c to UEs 115-a, 115-b, and 115-c respectively in a shared mmW spectrum. In response to the downlink CR signals 205, UEs 115-a, 115-b, and 115-c may transmit, respectively, uplink CR signals 210-a, 210-b, and 210-c. In some examples, the shared mmW spectrum may include licensed RF spectrum, unlicensed RF spectrum, or a combination of licensed and unlicensed RF spectrum.

Base station 105-a and UEs 115-a, 115-b, and 115-c may communicate using shared mmW spectrum and use directional CR signals (e.g., uplink or downlink) to reserve the transmission medium. For example, downlink CR signals 205-a, 205-b, and 205-c may each indicate a CR time period. In some examples, base station 105-a may transmit the downlink CR signals in a single burst transmission. In other examples, base station 105-a may transmit the downlink CR signals 205 sequentially or in a sequence of bursts. A neighboring UE 115 or base station 105 may identify the CR and refrain from transmitting on the channel during the indicated time period.

The CR may have a configurable duration, including start and stop times of the reservation. For example, base station 105-a may transmit a downlink CR signal 205 to UEs 115-a, 115-b, and 115-c, each downlink CR signal 205 indicating a CR time period of a common length. In other cases, base station 105-a may set the CR time period for a UE 115 to end after communication with base station 105-a (e.g., a CR time period for UE 115-a may end after UE 115-a has finished transmitting or receiving). In some cases, downlink CR signal 205-a, 205-b, or 205-c may also include an indication of a start time for the CR. Base station 105-a may set the start time to correspond with the start of communication for the corresponding UE 115 (e.g., a CR time period for UE 115-a may start when UE 115-a begins communication with base station 105-a). Base station 105-a may transmit downlink CR signals 205-a, 205-b, and 205-c to reserve the channel for both downlink and uplink transmissions.

Base station 105-a and UE 115 may use beamforming techniques to transmit directional CR signals. UE 115-a and base station 105-a may schedule transmissions using an LBT procedure, and base station 105-a may transmit downlink CR signal 205-a on a beam pointing to UE 115-a based on the LBT procedure. After reserving the channel, UE 115-a and base station 105-a may transmit data to each other on a directional beam chosen based on a beam tracking algorithm. A neighboring base station 105 or UE 115 may detect downlink CR signal 205-a and be alerted of the CR time period (e.g., when base station 105-a is scheduled to transmit or receive data). The neighboring base station 105 or UE 115 may not receive or transmit during the CR time period.

Transmissions including downlink CR signals 205 may be configured based on a direction of data communication (e.g., uplink or downlink) during the reserved time period. For example, if UE 115-a is scheduled for downlink transmission, downlink CR signal 205-a may be a CR transmit (CR-T) signal, and base station 105-a may also transmit a downlink pre-grant along with the CR-T signal. In response, UE 115-a may transmit a CR receive (CR-R) signal. In other examples, UE 115-a may be scheduled for uplink transmission. Therefore, base station 105-a may transmit a CR-R signal with an uplink pre-grant, and UE 115-a may transmit a CR-T signal in response. UE 115-a may detect the pre-grant and determine whether the pre-grant is appropriate for direction of transmission (e.g., a downlink pre-grant for a downlink transmission and an uplink pre-grant for an uplink transmission). UE 115-a may transmit an ACK to base station 105-a in response to the pre-grant and transmit an uplink CR signal 210 to reserve the transmission medium. Base station 105-a may begin communication upon receiving the pre-grant ACK and uplink CR signal 210-a from UE 115-a.

In some examples, base station 105-a may transmit multiple downlink CR signals 205 (e.g., downlink CR signal 205-a, 205-b, and 205-c) to multiple UEs 115 (e.g., UE 115-a, 115-b, and 115-c) in a downlink CR signal burst. Base station 105-a may transmit to UE 115-a, 115-b, and 115-c on different beams. In some cases, one or more of UE 115-a, 115-b, and 115-c may be in a similar beam direction from base station 105-a. For example, UEs 115-a and 115-b may be in a similar beam direction from base station 105-a, and base station 105-a may use a single beam for the transmissions to UEs 115-a and 115-b (not shown). For downlink transmission, base station 105-a may transmit a downlink pre-grant to scheduled UEs 115-a, 115-b, and 115-c, and downlink CR signals 205-a, 205-b, and 205-c may be CR-T signals. In response, UEs 115-a, 115-b, and 115-c may transmit uplink CR signals 210-a, 210-b, and 210-c, which may be CR-R signals. Base station 105-a may transmit downlink CR signals 205-a, 205-b, and 205-c on beams directed toward UEs 115-a, 115-b, and 115-c in a downlink burst. Base station 105-a may include transmission timing information in the downlink CR signal 205 and downlink pre-grant.

For example, UE 115-a may identify when to transmit or receive based on timing information in downlink CR signal 205-a or the corresponding pre-grant. A neighboring UE 115 may detect downlink CR signal 205-a and may not transmit during the CR time period based on the timing information. UE 115-a may transmit a pre-grant ACK and uplink CR signals 210-a in the same direction as the received downlink CR signal 205-a. UE 115-a may also include timing information and CR timing information (e.g., a CR duration or time period) in uplink CR signal 210-a, the pre-grant ACK, or both. If downlink CR signal 205-a is a CR-R signal, base station 105-a may receive the pre-grant ACK and transmit downlink data to UE 115-a. UE 115-a may receive the downlink transmission and transmit an ACK to base station 105-a in response. After receiving the ACK from UE 115-a, base station 105-a may transmit downlink data to UE 115-b. The process may continue until each of the UEs 115 in the CR signal burst has received downlink data and responded with an ACK/NAK.

In other examples, base station 105-a may transmit downlink CR signals 205-a, 205-b, and 205-c to multiple UEs 115-a, 115-b, and 115-c sequentially. For example, instead of transmitting in a downlink burst, base station 105-a may transmit downlink CR signals 205-a, 205-b, and 205-c one at a time and await an acknowledgment from the corresponding UE 115-a, 115-b, or 115-c. For downlink transmission, the downlink CR signals 205-a, 205-b, and 205-c may be CR-T signals. Base station 105-a may transmit downlink CR signal 205-a in a beam to UE 115-a and wait for a response. In some cases, base station 105-a may receive an acknowledgment from UE 115-a and detect uplink CR signal 210-a in response to downlink CR signal 205-*a*. Base station 105-*a* may then transmit downlink CR signal 205-*b* in a beam to UE 115-*b*. In other cases, base station 105-*a* may not receive an acknowledgment or responding uplink CR signal 210 from UE 115-*a*. Base station 105-*a* may then transmit downlink CR signal 205-*b* in a beam to UE 115-*b*. Downlink CR signal 205-*b* may schedule UE 115-*b* to transmit data during a resource originally scheduled for UE 115-*a*. Base station 105-*a* may transmit downlink data after the exchange of downlink CR signals 205-*a*, 205-*b*, and 205-*c*.

In other examples, base station 105-*a* may transmit downlink CR signals 205-*a*, 205-*b*, and 205-*c* to multiple UEs 115-*a*, 115-*b*, and 115-*c* in a sequence of one or more bursts. For example, base station 105-*a* may transmit downlink CR signals 205-*a* and 205-*b* in a first downlink burst and wait for a response from UEs 115-*a*, and 115-*b*. UEs 115-*a* and 115-*b* may receive, respectively, downlink CR signal 205-*a* and 205-*b*, and may transmit, respectively, uplink CR signals 210-*a* and 210-*b* in response. Base station 105-*a* may receive the upink CR signals 210 and transmit multiple downlink CR signals 205 in a second downlink burst to other UEs 115. The process may continue until base station 105-*a* has scheduled all of the time resources available for transmission. In some cases, UE 115-*a* or 115-*b* may not detect downlink CR signal 205-*a* or 205-*b*, or base station 105-*a* may not detect one of the uplink CR signals 210 in response. Base station 105-*a* may then schedule a different UE 115 for the corresponding resource in a later burst of downlink CR signals 205.

In some cases, base station 105-*a* may set the CR time period for UEs 115-*a*, 115-*b*, and 115-*c* to a common length. In some examples, the CR time period may start after transmission of each of the downlink CR signals 205-*a*, 205-*b*, and 205-*c*. The CR time period may end at the same time the downlink burst transmission ends (e.g., after the ACK/NAK is scheduled to be received from the last of UEs 115-*a*, 115-*b*, and 115-*c*). For example, the CR time period indicated in a downlink CR signal 205 may start after transmission of the downlink CR signal 205 and end at the same time as each other CR time period. A neighboring UE 115 may not transmit during the CR time period.

In some cases, base station 105-*a* may set the CR time period for UEs 115-*a*, 115-*b*, and 115-*c* to end with the scheduled data transmission for the respective UE 115. For example, base station 105-*a* may set the CR time period for UE 115-*a* to end when UE 115-*a* is scheduled to transmit an ACK/NAK for a data transmission. The CR time period may still start with the transmission of downlink CR signal 205-*a*. A neighboring UE 115 may contend for the medium and transmit on the channel after the scheduled ACK/NAK for the data transmission. The CR time period in each CR-R signal may start with the transmission of the CR-R signal, and end at the same time as the corresponding downlink CR signal 205-*a*, 205-*b*, or 205-*c* CR time period.

In some cases, base station 105-*a* may indicate a start time for a CR time period to UEs 115-*a*, 115-*b*, and 115-*c*, the CR spanning the scheduled data transmission for the corresponding UE 115. The start time may indicate when the CR will begin and may correspond to when the data transmission is scheduled to start. For example, base station 105-*a* may set the start time for UE 115-*a* to correspond with the scheduled start of data transmission between base station 105-*a* and UE 115-*a*. A neighboring UE 115 may reuse the time before the start point to contend for the medium and transmit on the channel. Base station 105-*a* may still set the CR time period for downlink CR signal 205-*a* to end when UE 115-*a* is finished with data transmission and scheduled to transmit the corresponding ACK/NAK such that the neighboring UE 115 may reuse the remaining time on the channel as well. The CR-R signal may indicate the same start time and CR time period as the corresponding downlink CR signal 205.

Similarly, base station 105-*a* may transmit downlink CR signals 205-*a*, 205-*b*, and 205-*c* to UEs 115-*a*, 115-*b*, and 115-*c* for uplink transmissions. In this case, the downlink CR signals 205-*a*, 205-*b*, and 205-*c* may be CR-R signals. Base station 105-*a* may transmit downlink CR signals 205-*a*, 205-*b*, and 205-*c* to UEs 115-*a*, 115-*b*, and 115-*c* respectively, either in an uplink burst, sequentially, or in sequential bursts. UEs 115-*a*, 115-*b*, and 115-*c* may receive downlink CR signal 205-*a*, 205-*b*, or 205-*c* and transmit a CR-T signal in response. Base station 105-*a* may receive each of the CR-T signals and transmit an uplink grant to UE 115-*a*. UE 115-*a* may receive the uplink grant and transmit uplink data to base station 105-*a*. Base station 105-*a* may then transmit an uplink grant to UE 115-*b*. The process may continue until UEs 115-*a*, 115-*b*, and 115-*c* all have transmitted uplink data to base station 105-*a*. Base station 105-*a* may indicate a CR time period in each downlink CR signal 205-*a*, 205-*b*, and 205-*c*.

Thus, in some cases, the CR time period for downlink CR signals 205-*a*, 205-*b*, and 205-*c* may all end after the last of UEs 115-*a*, 115-*b*, and 115-*c* is scheduled to transmit uplink data to base station 105-*a*. In other cases, the CR time period for downlink CR signal 205-*a*, 205-*b*, and 205-*c* may end after respective UE 115-*a*, 115-*b*, and 115-*c* is scheduled to transmit uplink data to base station 105-*a*. In some cases, the CR time period for downlink CR signal 205-*a*, 205-*b*, and 205-*c* may start after transmission of the respective downlink CR signal 205. In other cases, each downlink CR signal 205 may indicate a start time for the CR time period. Base station 105-*a* may set each start time to correspond with when the uplink grant is scheduled to be sent to UEs 115-*a*, 115-*b*, and 115-*c* respectively. UEs 115-*a*, 115-*b*, and 115-*c* may indicate the start times and CRs in their CR-T signals to match those in downlink CR signals 205-*a*, 205-*b*, and 205-*c* respectively.

Figure 3:
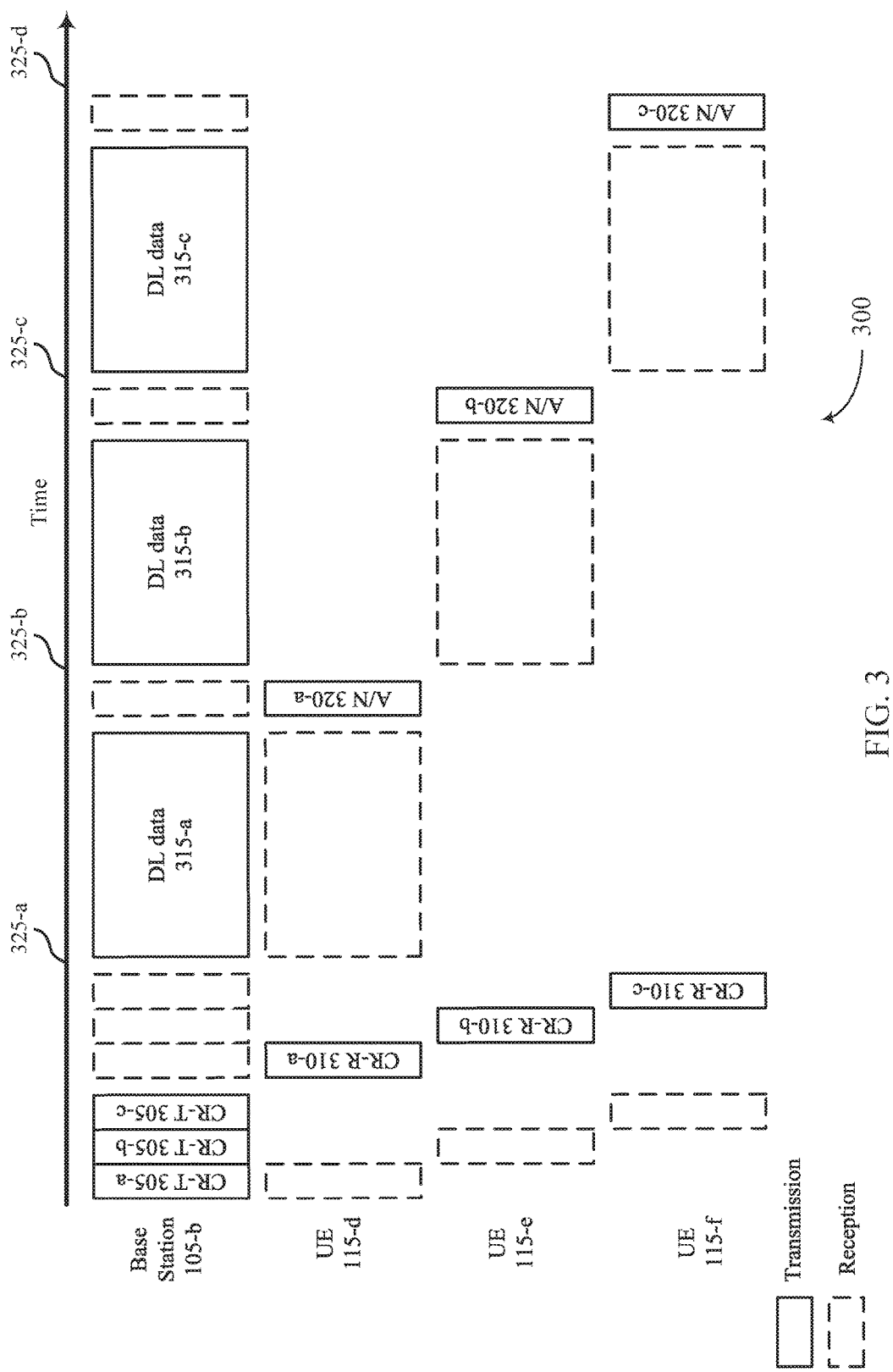
FIG. 3 illustrates an example of a downlink burst transmission 300 that supports directional CR for TDM downlink and uplink data burst transmission in accordance with aspects of the present disclosure.

FIG. 3 illustrates an example of a downlink burst transmission 300 for directional CR for TDM downlink and uplink data burst transmission. The downlink burst transmission 300 is illustrated with operations performed by base station 105-*b*, UE 115-*d*, UE 115-*e*, and UE 115-*f*, which may be examples of or may represent aspects of techniques performed by a base station 105 or a UE 115 as described with reference to FIGS. 1-2. In downlink burst transmission 300, base station 105-*b* may communicate with UE 115-*d*, UE 115-*e*, and UE 115-*f* in unlicensed mmW spectrum.

Base station 105-*b* may perform a directional LBT procedure to determine if the transmission medium is available. If the transmission medium is available, base station 105-*b* may transmit a directional CR-T signal 305 to each UE 115 in a single downlink burst. For example, base station 105-*b* may transmit CR-T signal 305-*a* to UE 115-*d*, CR-T signal 305-*b* to UE 115-*e*, and CR-T signal 305-*c* to UE 115-*f* in the downlink burst. In some examples, base station 105-*b* may use the transmission order of the CR-T signals 305 to determine timing information for transmissions from the UEs 115. Base station 105-*b* may transmit a pre-grant with each CR-T signal 305. The pre-grant may specify a transmission direction for the data (e.g., downlink if transmitted with a CR-T signal 305 by base station 105-*b*). In some examples, timing for the data transmission may be configured based on or included in the pre-grant.

Each UE 115 may receive the corresponding CR-T signal 305 and transmit a CR-R signal 310 in response. For example, UE 115-*d* may transmit CR-R signal 310-*a*, UE 115-*e* may transmit CR-R signal 310-*b*, and UE 115-*f* may transmit CR-R signal 310-*c* in order. The UEs 115 may transmit ACKs for the downlink pre-grants with the CR-R signals 310.

The CR-T signals 305 may indicate the corresponding CR time period. In some cases, the CR time period for CR-T signal 305-*a*, CR-T signal 305-*b*, and CR-T signal 305-*c* may be the same. In some cases, the CR time period may start immediately after transmission of the CR-T signal 305. The CR time period may end when the downlink burst transmission ends (e.g., time 325-*d*). In some examples, the CR time period indicated by each CR-R signal may start after transmission of the CR-R signal and end at the same time as indicated by the CR-T signal. A neighboring UE 115 may not contend for the medium or transmit during the CR time period.

In some cases, the CR time period for a UE 115 may end when scheduled transmission for the UE 115 ends. For example, CR-T signal 305-*a* may reserve the channel for UE 115-*d* until time 325-*b*. Similarly, CR-T signal 305-*b* may reserve the channel until time 325-*c* for UE 115-*e*, and CR-T signal 305-*c* may reserve the channel for UE 115-*f* until time 325-*d*.

In some examples, each CR-T signal 305 may also include an indication of a start time for a CR. For example, a start time of a CR for a UE 115 may correspond to when base station 105-*a* is scheduled to transmit downlink data to the UE 115. For example, CR-T signal 305-*a* may include an indication that the start time of the CR is time 325-*a*, when UE 115-*d* is scheduled to start receiving downlink data 315-*a*. Similarly, CR-T signal 305-*b* may indicate a start time for UE 115-*e* set to time 325-*b*, and CR-T signal 305-*c* may indicate a start time for UE 115-*f* set to time 325-*c*.

Base station 105-*b* may begin data transmission during the scheduled time after receiving ACKs for the pre-grants transmitted with the CR-T signals 305. For example, base station 105-*b* may transmit downlink data 315-*a* to UE 115-*d* starting at time 325-*a*. UE 115-*d* may transmit ACK/NAK 320-*a* to base station 105-*b* after the scheduled data transmission, depending on whether UE 115-*d* received and decoded downlink data 315-*a*. Similarly, UE 115-*e* may transmit ACK/NAK 320-*b* after receiving downlink data 315-*b*, and UE 115-*f* may transmit ACK/NAK 320-*c* after receiving downlink data 315-*c*.

Figure 4:
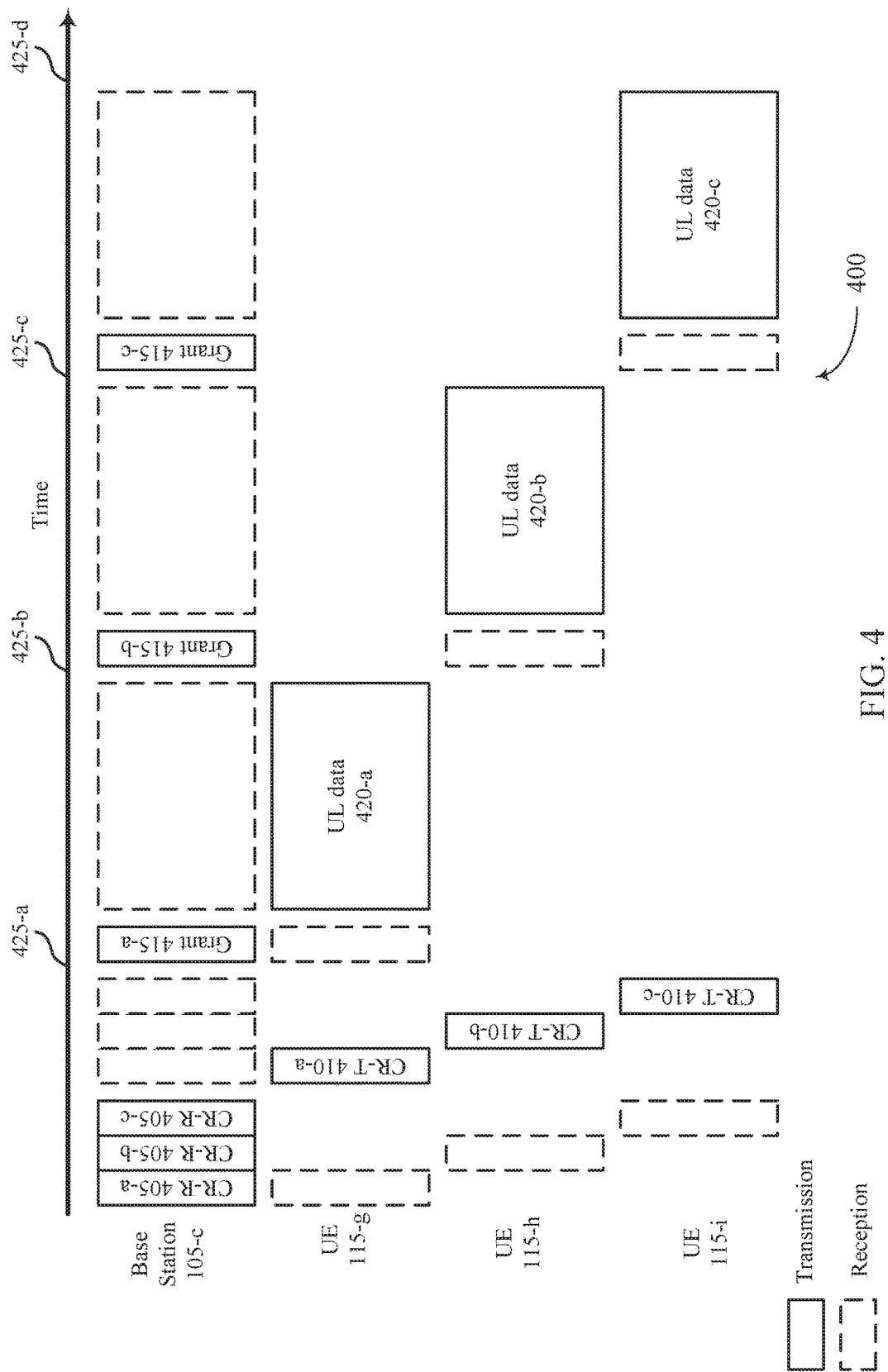
FIG. 4 illustrates an example of an uplink burst transmission 400 that supports directional CR for TDM downlink and uplink data burst transmission in accordance with aspects of the present disclosure.

FIG. 4 illustrates an example of an uplink burst transmission 400 for directional CR for TDM downlink and uplink data burst transmission. The uplink burst transmission 400 is illustrated with operations performed by base station 105-*c*, UE 115-*g*, UE 115-*h*, and UE 115-*i*, which may be examples of or may represent aspects of techniques performed by a base station 105 or a UE 115 as described with reference to FIGS. 1-3. In the uplink burst transmission 400, base station 105-*c* is in unlicensed mmW communication with UE 115-*g*, UE 115-*h*, and UE 115-*i*.

Base station 105-*c* may perform a directional LBT procedure to determine if the transmission medium is available. If the medium is available, base station 105-*c* may transmit a directional CR-R signal 405 to each UE 115 in a single burst. For example, base station 105-*c* may transmit CR-R signal 405-*a* to UE 115-*g*, CR-R signal 405-*b* to UE 115-*h*, and CR-R signal 405-*c* to UE 115-*i* in the uplink burst. In some examples, base station 105-*c* may use the transmission order of the CR-R signals 405 to determine timing information for transmissions from the UEs 115. Base station 105-*c* may transmit a pre-grant with each CR-R signal 405. The pre-grant may specify a transmission direction for the data (e.g., uplink if transmitted with a CR-R signal by base station 105-*c*). In some examples, timing for the data transmission may be configured based on the pre-grant.

Each UE 115 may receive the corresponding CR-R signal 405 and transmit a CR-T signal 410 in response. For example, UE 115-*g* may transmit CR-T signal 410-*a*, UE 115-*h* may transmit CR-T signal 410-*b*, and UE 115-*i* may transmit CR-T signal 410-*c* in order. The UEs 115 may transmit ACKs for the uplink pre-grants with the CR-T signals 410.

The CR-R signals 405 may indicate a CR time period. In some cases, the CR time period for CR-R signal 405-*a*, CR-R signal 405-*b*, and CR-R signal 405-*c* may be the same. For example, the CR time period may start immediately after transmission of the CR-R signal 405 and end when the uplink burst transmission ends (e.g., time 425-*d*). The CR time period indicated in each CR-T signal may start after transmission of the CR-T signal, and end at the same time as the CR-R signal CR time period. A neighboring UE 115 may not contend for the medium or transmit during the CR based on the CR time period information included in a received CR signal.

In other examples, the CR time period for a UE 115 may end when a granted transmission period for the UE 115 ends (e.g., the UE 115 finishes an uplink transmission). For example, CR-R signal 405-*a* may reserve the channel for UE 115-*g* until time 425-*b*. Similarly, CR-R signal 405-*b* may reserve the channel until time 425-*c* for UE 115-*h*, and CR-R signal 405-*c* may reserve the channel for UE 115-*i* until time 425-*d*.

In some examples, each CR-R signal 405 may also include an indication of a start time for a CR time period. For example, the start time of the CR for a UE 115 may correspond to when base station 105-*c* transmits an uplink grant 415 to the UE 115. For example, CR-R signal 405-*a* may include an indication that the start time of the CR is time 425-*a*, when base station 105-*c* is scheduled to transmit uplink grant 415-*a* to UE 115-*g*. Similarly, CR-R signal 405-*b* may indicate a start time set to time 425-*b*, and CR-R signal 405-*c* may indicate a start time set to time 425-*c*.

Base station 105-*c* may transmit grants for uplink data transmission to the UEs 115 after receiving ACKs for the pre-grants transmitted with the CR-R signals 405. For example, base station 105-*c* may transmit uplink grant 415-*a* to UE 115-*g* starting at time 425-*a*. Thus, UE 115-*g* may transmit uplink data 420-*a* to base station 105-*c* after receiving uplink grant 415-*a*, UE 115-*h* may transmit uplink data 420-*b* after receiving uplink grant 415-*b*, and UE 115-*i* may transmit uplink data 420-*c* after receiving uplink grant 415-*c*.

Figure 5:
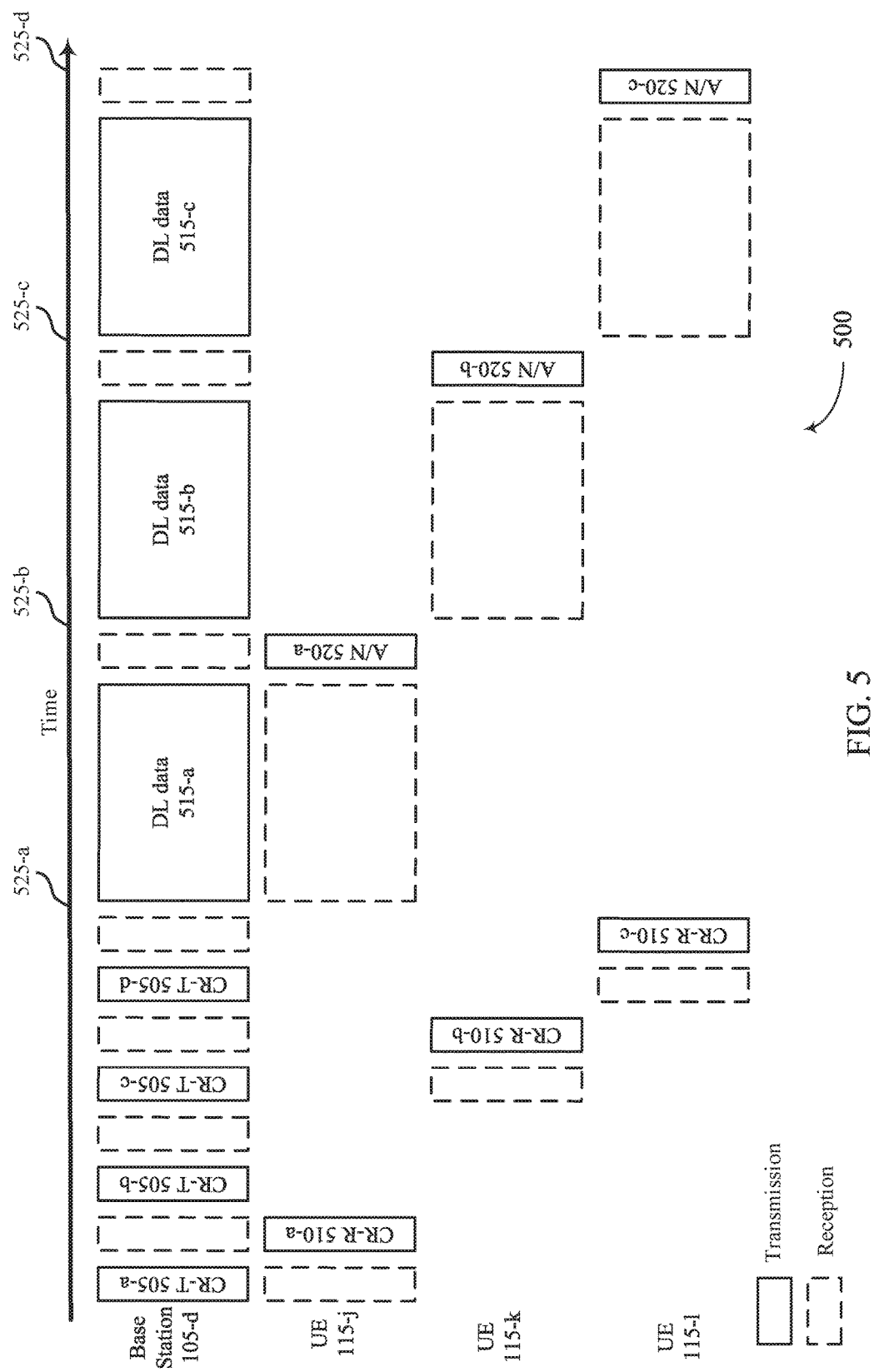
FIG. 5 illustrates an example of a sequential CR transmission 500 that supports directional CR for TDM downlink and uplink data burst transmission in accordance with aspects of the present disclosure.

FIG. 5 illustrates an example of a sequential CR transmission 500 for directional CR for TDM downlink and uplink data burst transmission. If the medium is available, base station 105-*d* may sequentially transmit a directional CR-T signal 505 to each UE 115 to reserve transmission medium for downlink communication. For example, base station 105-*d* may transmit CR-T signal 505-*a* to UE 115-*j*. Base station 105-*d* may then wait for UE 115-*j* to respond with a CR-R signal 510. UE 115-*j* may receive CR-T signal 505-*a* and transmit CR-R signal 510-*a* to base station 105-*d* in response. Base station 105-*d* may wait for a response from UE 115-*j* prior to transmitting another CR-T signal 505.

In some examples, base station 105-*d* may transmit a CR-T signal 505 to a UE 115, but base station 105-*d* may not receive a CR-R signal 510 in response. For example, the UE 115 may not win contention for the transmission medium. Therefore, base station 105-*d* may schedule a different UE 115 to utilize the missed resource. For example, base station 105-*d* may transmit CR-T signal 505-*b* to a fourth UE 115 (not shown) to schedule transmission from time 525-*b* to time 525-*c*, but base station 105-*d* may not receive an acknowledgment for CR-T signal 505-*b* or a CR-R signal 510 in response. Base station 105-*d* may then transmit CR-T signal 505-*c* to UE 115-*k*. UE 115-*k* may receive CR-T signal 505-*c* and transmit CR-R signal 510-*b* in response. Base station 105-*d* may then transmit CR-T signal 505-*c* to UE 115-*l* and receive CR-R signal 510-*c* in response.

In some examples, base station 105-*d* may use the transmission order of the CR-T signals 505 to determine timing information for transmissions from the UEs 115. Base station 105-*d* may transmit a pre-grant with each CR-T signal 505. The pre-grant may specify a transmission direction for the data (e.g., downlink if transmitted with a CR-T signal by base station 105-*d*). In some examples, timing for the data transmission may be configured based on the pre-grant. The UEs 115 may transmit ACKs for the downlink pre-grants with the CR-R signals 510.

The CR-T signals 505 may indicate a CR time period. In some cases, the CR time period for CR-T signal 505-*a*, CR-T signal 505-*b*, CR-T signal 505-*c*, and CR-T signal 505-*d* may be the same. In some cases, the CR time period may start after transmission of the CR-T signal 505. The CR time period may end when the downlink transmission ends (e.g., time 525-*d*). The CR time period in each CR-R signal may start after transmission of the CR-R signal, and end at the same time as the CR-T signal CR time period. A neighboring UE 115 may not contend for the medium or transmit during the CR.

In some cases, the CR time period for a UE 115 may end when scheduled transmission for the UE 115 ends. For example, CR-T signal 505-*a* may reserve the channel for UE 115-*j* until time 525-*b*. Similarly, CR-T signal 505-*c* may reserve the channel until time 525-*c* for UE 115-*k*, and CR-T signal 505-*d* may reserve the channel for UE 115-*l* until time 525-*d*.

In some examples, each CR-T signal 505 may also include an indication of a start time for a CR. For example, a start time of a CR for a UE 115 may correspond to when base station 105-*d* is scheduled to transmit downlink data to the UE 115. For example, CR-T signal 505-*a* may include an indication that the start time of the CR is time 525-*a*, when UE 115-*j* is scheduled to start receiving downlink data 515-*a*. Similarly, CR-T signal 505-*c* may indicate a start time set to time 525-*b*, and CR-T signal 505-*d* may indicate a start time set to time 525-*c*.

Base station 105-*d* may begin data transmission during the scheduled time after receiving ACKs for pre-grants transmitted with the CR-T signals 505. Base station 105-*d* may transmit downlink data 515-*a* to UE 115-*j* starting at time 525-*a*. UE 115-*j* may transmit ACK/NAK 520-*a* to base station 105-*d* after the scheduled data transmission, depending on whether UE 115-*j* received and decoded downlink data 515-*a*.

Base station 105-*d* may perform a directional LBT procedure to determine if the transmission medium is available. If the medium is available, base station 105-*d* may sequentially transmit a directional CR-T signal 505 to each UE 115. For example, base station 105-*d* may transmit CR-T signal 505-*a* to UE 115-*j*. Base station 105-*d* may then wait for UE 115-*j* to respond with a CR-R signal 510. UE 115-*j* may receive CR-T signal 505-*a* and transmit CR-R signal 510-*a* to base station 105-*d* in response.

In some examples, base station 105-*d* may transmit a CR-T signal 505 to a UE 115, but base station 105-*d* may not receive a CR-R signal 510 in response. For example, the UE 115 may not win contention for the transmission medium. Therefore, base station 105-*d* may schedule a different UE 115 to utilize the missed resource. For example, base station 105-*d* may transmit CR-T signal 505-*b* to a fourth UE 115 (not shown) to schedule transmission from time 525-*b* to time 525-*c*, but base station 105-*d* may not receive an acknowledgment, for CR-T signal 505-*b*, or a CR-R signal 510 in response. Base station 105-*d* may then transmit CR-T signal 505-*c* to UE 115-*k*. UE 115-*k* may receive CR-T signal 505-*c* and transmit CR-R signal 510-*b* in response. Base station 105-*d* may then transmit CR-T signal 505-*d* to UE 115-*l* and receive CR-R signal 510-*c* in response.

In some examples, base station 105-*d* may use the transmission order of the CR-T signals 505 to determine timing information for transmissions from the UEs 115. Base station 105-*d* may transmit a pre-grant with each CR-T signal 505. The pre-grant may specify a transmission direction for the data (e.g., downlink if transmitted with a CR-T signal by base station 105-*d*). In some examples, timing for the data transmission may be configured based on the pre-grant. The UEs 115 may transmit ACKs for the downlink pre-grants with the CR-R signals 510.

The CR-T signals 505 may indicate a CR time period. In some cases, the CR time period for CR-T signal 505-*a*, CR-T signal 505-*b*, CR-T signal 505-*c*, and CR-T signal 505-*d* may be the same. In some cases, the CR time period may start after transmission of the CR-T signal 505. The CR time period may end when the downlink transmission ends (e.g., time 525-*d*). The CR time period indicated in each CR-R signal may start after transmission of the CR-R signal, and end at the same time as the CR-T signal CR time period. A neighboring UE 115 may not contend for the medium or transmit during the CR.

In some cases, the CR time period for a UE 115 may end when scheduled transmission for the UE 115 ends. For example, CR-T signal 505-*a* may reserve the channel for UE 115-*j* until time 525-*b*. Similarly, CR-T signal 505-*c* may reserve the channel until time 525-*c* for UE 115-*k*, and CR-T signal 505-*d* may reserve the channel for UE 115-*l* until time 525-*d*.

In some examples, each CR-T signal 505 may also include an indication of a start time for a CR. For example, a start time of a CR for a UE 115 may correspond to when base station 105-*d* is scheduled to transmit downlink data to the UE 115. For example, CR-T signal 505-*a* may include an indication that the start time of the CR is time 525-*a*, when UE 115-*j* is scheduled to start receiving downlink data 515-*a*. Similarly, CR-T signal 505-*c* may indicate a start time set to time 525-*b*, and CR-T signal 505-*d* may indicate a start time set to time 525-*c*.

Base station 105-*d* may begin data transmission during the scheduled time after receiving ACKs for pre-grants transmitted with the CR-T signals 505. Base station 105-*d* may transmit downlink data 515-*a* to UE 115-*j* starting at time 525-*a*. UE 115-*j* may transmit ACK/NAK 520-*a* to base station 105-*d* after the scheduled data transmission, depending on whether UE 115-*j* received and decoded downlink data 515-*a*. Similarly, UE 115-*k* may transmit ACK/NAK 520-*b* in response to downlink data 515-*b*, and UE 115-*l* may transmit ACK/NAK 520-*c* in response to downlink data 515-*c*.

Figure 6:
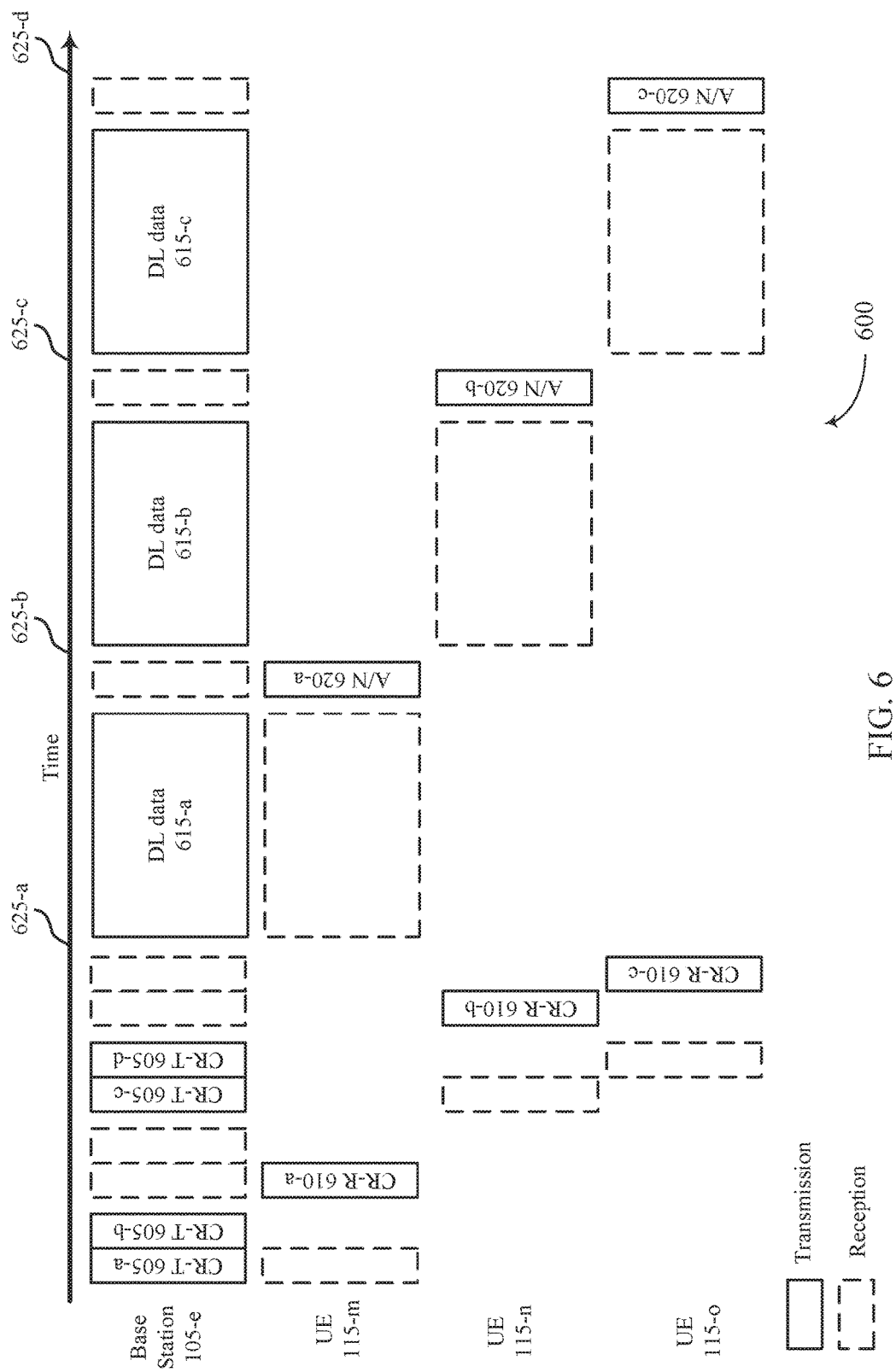
FIG. 6 illustrates an example of a sequential burst of CR signals 600 that supports directional CR for TDM downlink and uplink data burst transmission in accordance with aspects of the present disclosure.

FIG. 6 illustrates an example of a sequential burst of CR signals 600 for directional CR for TDM downlink and uplink data burst transmission. The sequential burst of CR signals 600 may include base station 105-*e*, UE 115-*m*, UE 115-*n*, and UE 115-*o*, which may be examples of or may represent aspects of techniques performed by a base station 105 or a UE 115 as described with reference to FIGS. 1-2. In the sequential burst of CR signals 600, base station 105-*e* is in unlicensed mmW communication with UE 115-*m*, UE 115-*n*, and UE 115-*o*.

Base station 105-*e* may perform a directional LBT procedure to determine if the transmission medium is available. If the medium is available, base station 105-*e* may transmit a directional CR-T signal 605 to multiple UEs 115 in a single downlink burst. For example, base station 105-*e* may transmit CR-T signal 605-*a* to UE 115-*m* and CR-T signal 605-*b* to a UE 115 not shown. Base station 105-*e* may wait for the UEs 115 to respond before transmitting another CR-T signal 605. UE 115-*m* may receive CR-T signal 605-*a* and transmit CR-R signal 610-*a* to base station 105-*e* in response. Base station 105-*e* may not receive a CR-R signal 610 in response from the UE 115 not shown, and may schedule a different UE 115 to utilize the missed resource in a later downlink burst. Base station 105-*e* may then transmit a second downlink burst. For example, base station 105-*e* may transmit CR-T signal 605-*c* to UE 115-*n* and CR-T signal 605-*d* to UE 115-*o*. UE 115-*n* may receive CR-T signal 605-*c* and transmit CR-R signal 610-*b* in response, and UE 115-*o* may receive CR-T signal 605-*d* and transmit CR-R signal 610-*c* in response. CR-T signal 605-*c* may schedule UE 115-*n* for transmission during the missed time resource from 625-*b* to 625-*c*.

In some examples, base station 105-*e* may use the transmission order of the CR-T signals 605 to determine timing information for transmissions from the UEs 115. Base station 105-*e* may transmit a pre-grant with each CR-T signal 605. The pre-grant may specify a transmission direction for the data (e.g., downlink if transmitted with a CR-T signal by base station 105-*e*). In some examples, timing for the data transmission may be configured based on the pre-grant. The UEs 115 may transmit ACKs for the downlink pre-grants with the CR-R signals 610.

The CR-T signals 605 may indicate a CR time period. In some cases, the CR time period for CR-T signal 605-*a*, CR-T signal 605-*b*, CR-T signal 605-*c*, and CR-T signal 605-*d* may be the same. In some cases, the CR time period may start after transmission of the CR-T signal 605. The CR time period may end when the downlink burst transmission ends (e.g., time 625-*d*). The CR time period in each CR-R signal may start after transmission of the CR-R signal, and end at the same time as the CR-T signal CR time period. A neighboring UE 115 may not contend for the medium or transmit during the CR.

In some cases, the CR time period for a UE 115 may end when scheduled transmission for the UE 115 ends. For example, CR-T signal 605-*a* may reserve the channel for UE 115-*m* until time 625-*b*. Similarly, CR-T signal 605-*c* may reserve the channel until time 625-*c* for UE 115-*n*, and CR-T signal 605-*d* may reserve the channel for UE 115-*o* until time 625-*d*.

In some examples, each CR-T signal 605 may also include an indication of a start time for a CR. For example, a start time of a CR for a UE 115 may correspond to when base station 105-*e* is scheduled to transmit downlink data to the UE 115. For example, CR-T signal 605-*a* may include an indication that the start time of the CR is time 625-*a*, when UE 115-*m* is scheduled to start receiving downlink data 615-*a*. Similarly, CR-T signal 605-*c* may indicate a start time set to time 625-*b*, and CR-T signal 605-*d* may indicate a start time set to time 625-*c*.

Base station 105-*e* may begin data transmission during the scheduled time after receiving ACKs for pre-grants transmitted with the CR-T signals 605. Base station 105-*e* may transmit downlink data 615-*a* to UE 115-*m* starting at time 625-*a*. UE 115-*m* may transmit ACK/NAK 620-*a* to base station 105-*e* after the scheduled data transmission, depending on whether UE 115-*m* received and decoded downlink data 615-*a*. Similarly, UE 115-*n* may transmit ACK/NAK 620-*b* to base station 105-*e* after downlink data transmission 615-*b*, and UE 115-*o* may transmit ACK/NAK 620-*c* after downlink data transmission 615-*c*.

Figure 7:
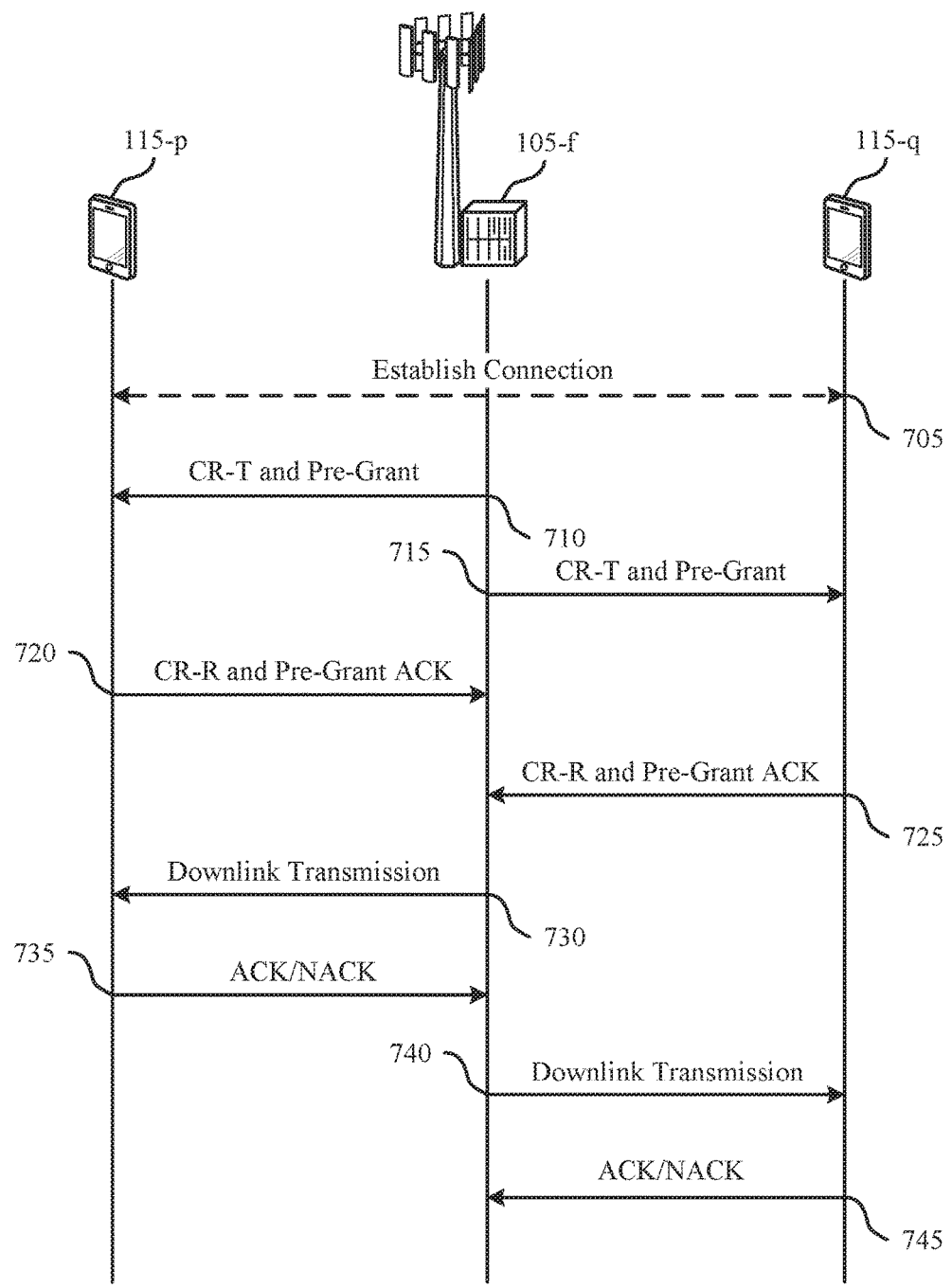
FIG. 7 illustrates an example of a process flow that supports directional CR for TDM downlink and uplink data burst transmission in accordance with aspects of the present disclosure.

FIG. 7 illustrates an example of a process flow 700 for directional CR for TDM downlink and uplink data burst transmission. Process flow 700 may include base station 105-*f* and UEs 115-*p* and 115-*q*, which may be examples of a base station 105 and UEs 115 as described with reference to FIGS. 1-4. Process flow 700 depicts CR for downlink transmission, but other implementations may additionally or alternatively include CR for uplink transmission.

At step 705, base station 105-*f* may establish a connection with UEs 115-*p* and 115-*q*. Base station 105-*f* may select a first beam direction in a shared RF spectrum band to use to communicate with UE 115-*p*. Base station 105-*f* may select a second beam direction in the shared RF spectrum band to use to communicate with UE 115-*q*.

At step 710, base station 105-*f* may transmit a first CR signal to UE 115-*p*. Base station 105-*f* may transmit the first CR signal using the first beam direction. The first CR signal may indicate a first reserved time period. At step 715, base station 105-*f* may transmit a second CR signal to UE 115-*q* before receiving a CR signal in response to the first CR signal. The second CR signal may indicate a second reserved time period. Base station 105-*f* may transmit the second CR signal using the second beam direction. The first and second CR signals may be sent in a same burst.

At step 720, UE 115-*p* may transmit a third CR signal to base station 105-*f* in response to the first CR signal. The third CR signal may indicate the first reserved time period. UE 115-*p* may transmit the third CR signal using the first beam direction. At step 725, UE 115-*q* may transmit a fourth CR signal to base station 105-*f* in response to the second CR signal. The fourth CR signal may indicate the second reserved time period. UE 115-*q* may transmit the fourth CR signal using the second beam direction.

At step 730, base station 105-*f* may communicate with UE 115-*p* during the first reserved time period. The communication may be based on the first and third CR signals. The communication may include base station 105-*f* transmitting a downlink transmission. At step 735, UE 115-*p* may transmit an acknowledgment to base station 105-*f* in response to the downlink transmission.

At step 740, base station 105-*f* may communicate with UE 115-*q* during the second reserved time period. The communication may be based on the second and fourth CR signals. The communication may include base station 105-*f* transmitting a downlink transmission. At step 745, UE 115-*q* may transmit an acknowledgment to base station 105-*f* in response to the downlink transmission.

Figure 8:
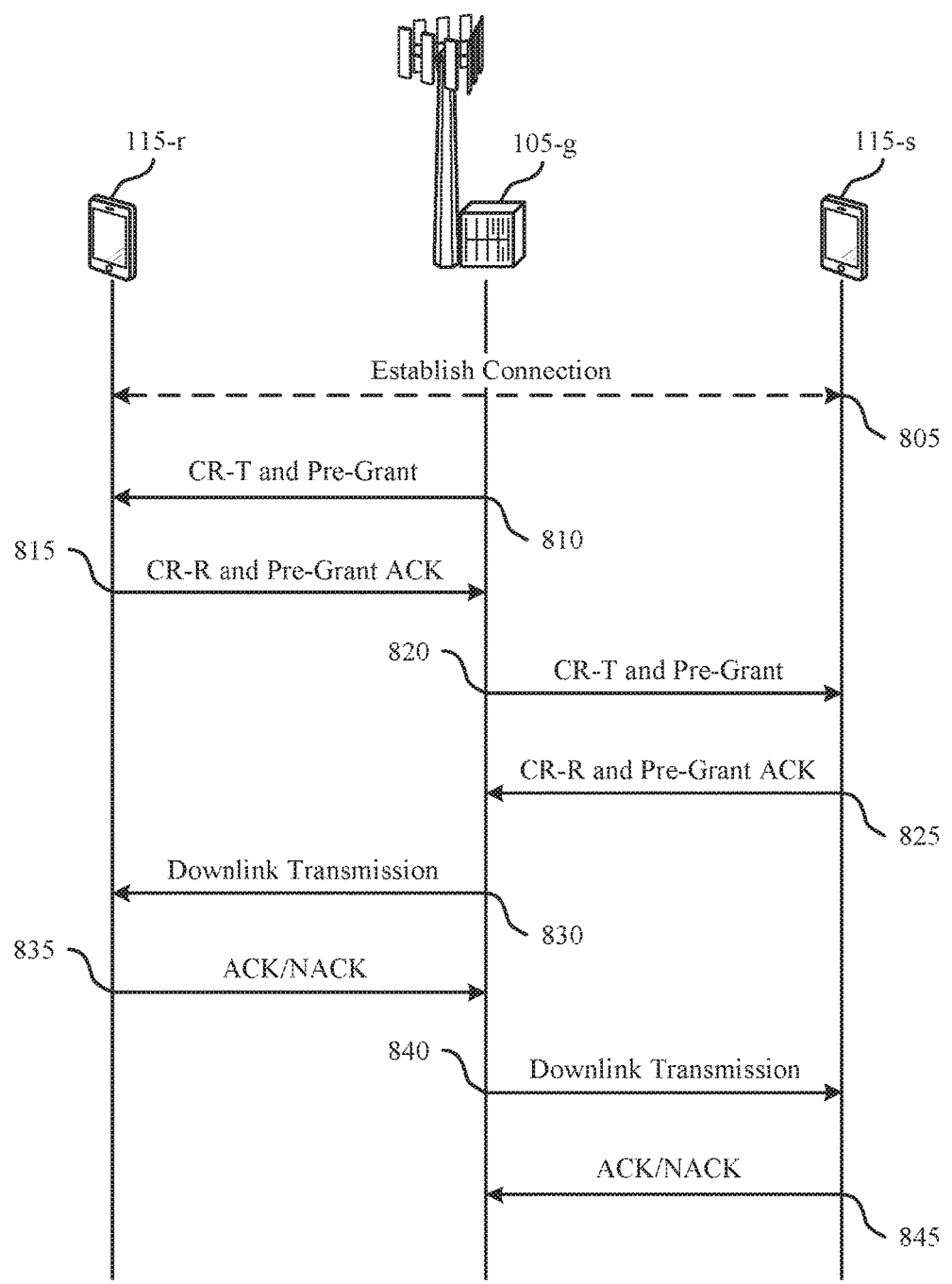
FIG. 8 illustrates an example of a process flow that supports directional CR for TDM downlink and uplink data burst transmission in accordance with aspects of the present disclosure.

FIG. 8 illustrates an example of a process flow 800 for directional CR for TDM downlink and uplink data burst transmission. Process flow 800 may include base station 105-*g* and UEs 115-*r* and 115-*s*, which may be examples of a base station 105 and UEs 115 as described with reference to FIGS. 1-2 and 5. Process flow 800 depicts CR for downlink transmission, but other implementations may additionally or alternatively include CR for uplink transmission.

At step 805, base station 105-g may establish a connection with UEs 115-r and 115-s. Base station 105-g may select a first beam direction in a shared RF spectrum band to transmit to UE 115-r in. Base station 105-g may select a second beam direction in the shared RF spectrum band to transmit to UE 115-s in.

At step 810, base station 105-g may transmit a first CR signal to UE 115-r. The first CR signal may indicate a first reserved time period. At step 815, UE 115-r may transmit a third CR signal to base station 105g in response to the first CR signal before base station 105g transmits a second CR signal. The third CR signal may indicate the first reserved time period.

At step 820, base station 105g may transmit a second CR signal to UE 115-s based on the third CR signal. The second CR signal may indicate a second reserved time period. At step 825, UE 115-s may transmit a fourth CR signal to base station 105g in response to the second CR signal. The fourth CR signal may indicate the second reserved time period.

At step 830, base station 105g may communicate with UE 115-r during the first reserved time period. The communication may be based on the first and third CR signals. The communication may include base station 105g transmitting a downlink transmission. At step 835, UE 115-r may transmit an acknowledgment to base station 105g in response to the downlink transmission.

At step 840, base station 105g may communicate with UE 115-s during the second reserved time period. The communication may be based on the second and fourth CR signals. The communication may include base station 105g transmitting a downlink transmission. At step 845, UE 115-s may transmit an acknowledgment to base station 105g in response to the downlink transmission.

Figure 9:
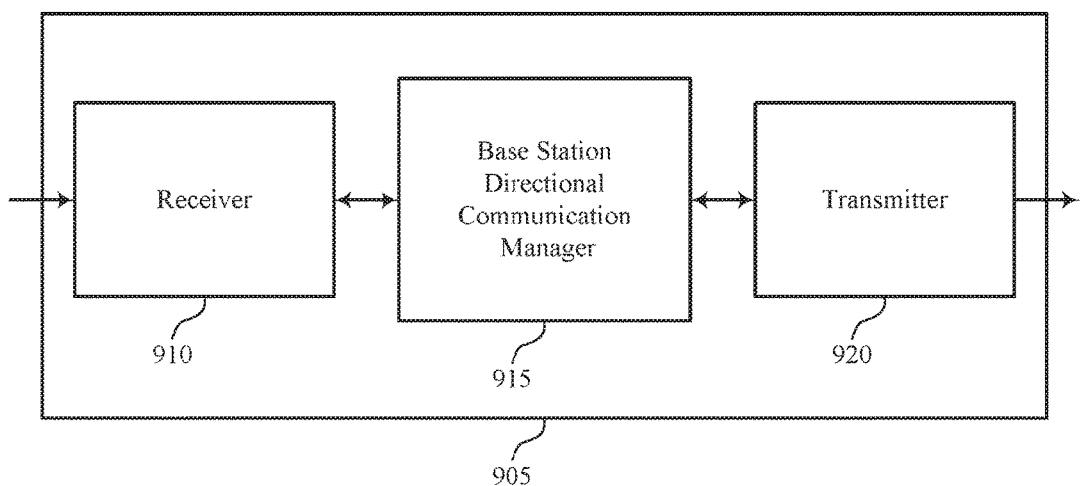
FIGS. 9 through 11 show block diagrams of a device that supports directional CR for TDM downlink and uplink data burst transmission in accordance with aspects of the present disclosure.

FIG. 9 shows a block diagram 900 of a wireless device 905 that supports directional CR for TDM downlink and uplink data burst transmission in accordance with various aspects of the present disclosure. Wireless device 905 may be an example of aspects of a base station 105 as described with reference to FIG. 1. Wireless device 905 may include receiver 910, base station directional communication manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to directional CR for TDM downlink and uplink data burst transmission, etc.). Information may be passed on to other components of the device. The receiver 910 may be an example of aspects of the transceiver 1235 described with reference to FIG. 12.

Receiver 910 may communicate with a third UE 115 in the shared RF spectrum band during the reserved time period based on a sixth CR signal and a seventh CR signal. Base station directional communication manager 915 may be an example of aspects of the base station directional communication manager 1215 described with reference to FIG. 12.

Base station directional communication manager 915 and/or at least some of its various sub-components may be implemented in hardware, software executed by a processor, firmware, or any combination thereof. If implemented in software executed by a processor, the functions of the base station directional communication manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station directional communication manager 915 and/or at least some of its various sub-components may be physically located at various positions, including being distributed such that portions of functions are implemented at different physical locations by one or more physical devices. In some examples, base station directional communication manager 915 and/or at least some of its various sub-components may be a separate and distinct component in accordance with various aspects of the present disclosure. In other examples, base station directional communication manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station directional communication manager 915 may transmit a first CR signal indicating a first reserved time period to a first UE 115 using a first beam direction in a shared RF spectrum band, and transmit a second CR signal indicating a second reserved time period to a second UE 115 using a second beam direction different from the first beam direction in the shared RF spectrum band. In some cases, base station directional communication manager 915 may receive, in response to the first CR signal, a third CR signal indicating the first reserved time period from the first UE 115 using the first beam direction in the shared RF spectrum band and receive, in response to the second CR signal, a fourth CR signal indicating the second reserved time period from the second UE 115 using the second beam direction in the shared RF spectrum band.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Transmitter 920 may communicate with the first UE 115 using the first beam direction in the shared RF spectrum band during the first reserved time period based on the first CR signal and the third CR signal and communicate with the second UE 115 using the second beam direction in the shared RF spectrum band during the second reserved time period based on the second CR signal and the fourth CR signal.

Figure 10:
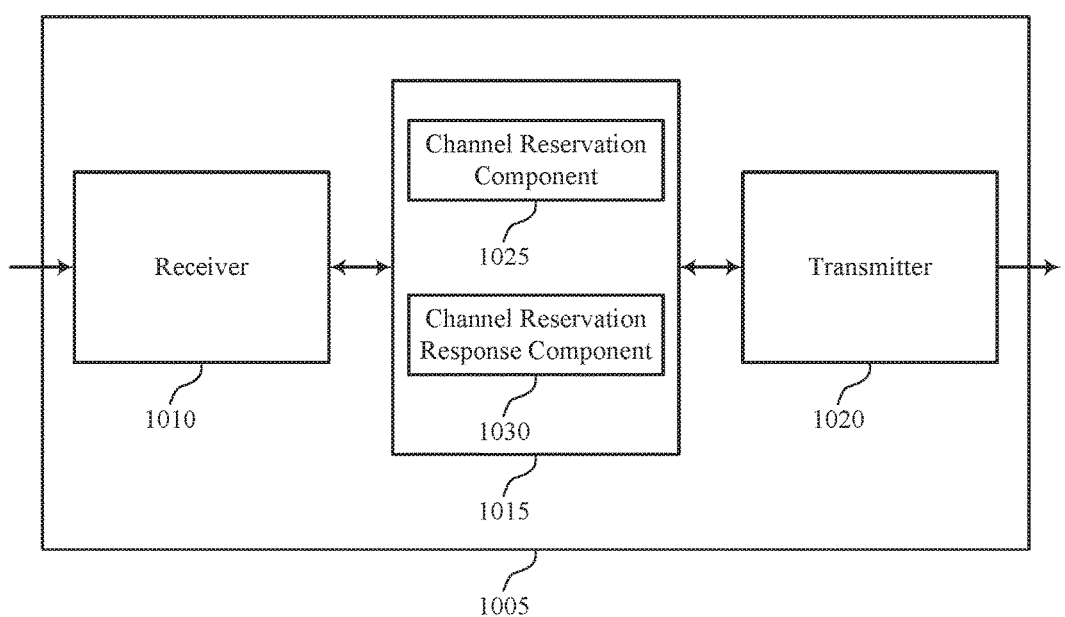

FIG. 10 shows a block diagram 1000 of a wireless device 1005 that supports directional CR for TDM downlink and uplink data burst transmission in accordance with various aspects of the present disclosure. Wireless device 1005 may be an example of aspects of a wireless device 905 or a base station 105 as described with reference to FIGS. 1 and 9. Wireless device 1005 may include receiver 1010, base station directional communication manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to directional CR for TDM downlink and uplink data burst transmission, etc.). Information may be passed on to other components of the device. The receiver 1010 may be an example of aspects of the transceiver 1235 described with reference to FIG. 12.

Base station directional communication manager 1015 may be an example of aspects of the base station directional communication manager 1215 described with reference to FIG. 12. Base station directional communication manager 1015 may also include channel reservation component 1025, and channel reservation response component 1030.

The base station directional communication manager 1015 may be implemented in hardware, software executed by a processor, firmware, or any combination thereof. If implemented in software executed by a processor, the functions of the base station directional communication manager 1015 may be executed by a general-purpose processor, a DSP, an ASIC, an FPGA or other programmable logic device, discrete gate or transistor logic, discrete hardware components, or any combination thereof designed to perform the functions described in the present disclosure. The base station directional communication manager 1015 may be physically located at various positions, including being distributed such that portions of functions are implemented at different physical locations by one or more physical devices. In some examples, base station directional communication manager 1015 may be a separate and distinct component in accordance with various aspects of the present disclosure. In other examples, base station directional communication manager 1015 may be combined with one or more other hardware components, including but not limited to a receiver, a transmitter, a transceiver, or another component or components in accordance with various aspects of the present disclosure Channel reservation component 1025 may transmit a first CR signal indicating a first reserved time period to a first UE 115 using a first beam direction in a shared RF spectrum band and transmit a second CR signal indicating a second reserved time period to a second UE 115 using a second beam direction different from the first beam direction in the shared RF spectrum band. In some examples, channel reservation component 1025 may transmit a fifth CR signal indicating the second reserved time period to a third UE 115 before transmitting the second CR signal, determine that a response to the fifth CR signal was not received during a designated time period, where transmitting the second CR signal is based on the determination. In some examples, channel reservation component 1025 may transmit a sixth CR signal to a third UE 115, where the sixth CR signal indicates a start time of a third reserved time period and an end time of the third reserved time period, and where the start time is different from a transmission time of the sixth CR signal. In some cases, the first CR signal and the second CR signal are transmitted in a same burst before receiving the third CR signal and the fourth CR signal. In some cases, the third CR signal is received before transmitting the fifth CR signal. In some cases, the fifth CR signal is transmitted in a same burst as the first CR signal before receiving the third CR signal. In some cases, the transmitting the sixth CR signal, the receiving the seventh CR signal, the communicating with the third UE 115 in the shared RF spectrum band, or any combination thereof is based on directional transmission using a beam direction to or from the third UE 115. In some cases, the shared RF spectrum band includes an unlicensed RF spectrum band that includes an mmW spectrum band.

Channel reservation response component 1030 may receive, in response to the first CR signal, a third CR signal indicating the first reserved time period from the first UE 115 using the first beam direction in the shared RF spectrum band and receive, in response to the second CR signal, a fourth CR signal indicating the second reserved time period from the second UE 115 using the second beam direction in the shared RF spectrum band. In some examples, channel reservation response component 1030 may receive a seventh CR signal from the third UE 115 in response to the sixth CR signal, where the seventh CR signal indicates the start time and the end time of the reserved time period. In some cases, the third CR signal and the fourth CR signal are received before communicating with the first UE 115 and the second UE 115. In some cases, the third CR signal is received before transmitting the second CR signal, where transmitting the second CR signal is based on the third CR signal. In some cases, the fourth CR signal is received before communicating with the first UE 115 and the second UE 115.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
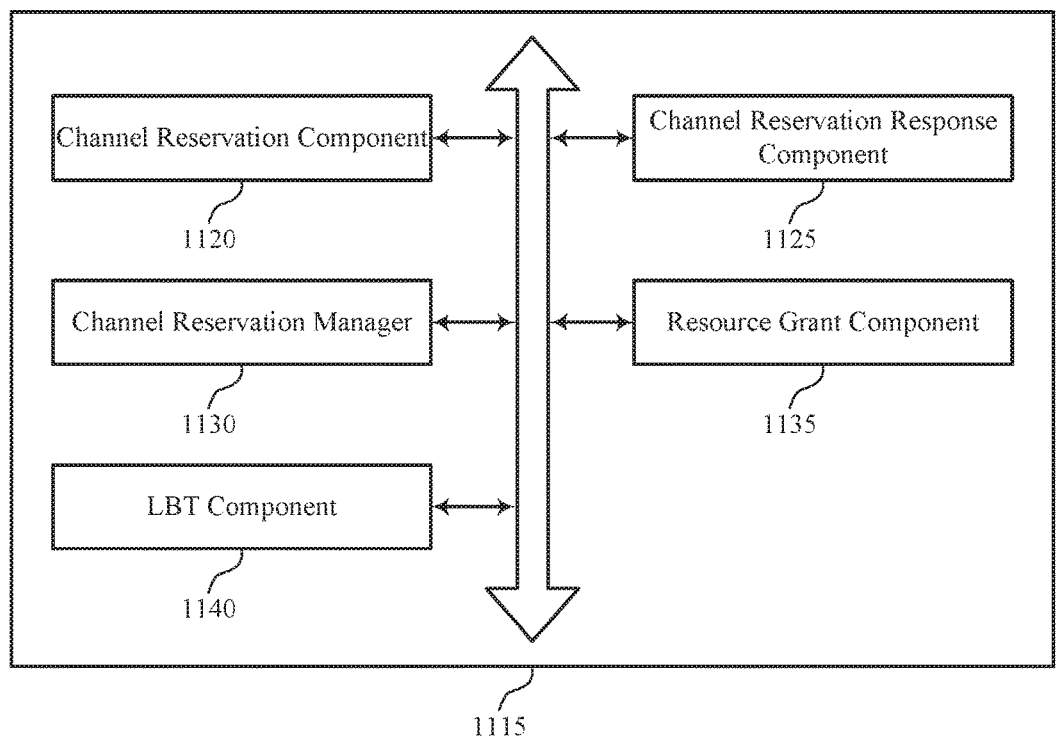

FIG. 11 shows a block diagram 1100 of a base station directional communication manager 1115 that supports directional CR for TDM downlink and uplink data burst transmission in accordance with various aspects of the present disclosure. The base station directional communication manager 1115 may be an example of aspects of a base station directional communication manager 915, a base station directional communication manager 1015, or a base station directional communication manager 1215 described with reference to FIGS. 9, 10, and 12. The base station directional communication manager 1115 may include channel reservation component 1120, channel reservation response component 1125, channel reservation manager 1130, resource grant component 1135, and LBT component 1140. Each of these modules may communicate, directly or indirectly, with one another (e.g., via one or more buses).

The base station directional communication manager 1115 may be implemented in hardware, software executed by a processor, firmware, or any combination thereof. If implemented in software executed by a processor, the functions of the base station directional communication manager 1115 may be executed by a general-purpose processor, a DSP, an ASIC, an FPGA or other programmable logic device, discrete gate or transistor logic, discrete hardware components, or any combination thereof designed to perform the functions described in the present disclosure. The base station directional communication manager 1115 may be physically located at various positions, including being distributed such that portions of functions are implemented at different physical locations by one or more physical devices. In some examples, base station directional communication manager 1115 may be a separate and distinct component in accordance with various aspects of the present disclosure. In other examples, base station directional communication manager 1115 may be combined with one or more other hardware components, including but not limited to a receiver, a transmitter, a transceiver, or another component or components in accordance with various aspects of the present disclosure.

Channel reservation component 1120 may transmit a first CR signal indicating a first reserved time period to a first UE 115 using a first beam direction in a shared RF spectrum band and transmit a second CR signal indicating a second reserved time period to a second UE 115 using a second beam direction different from the first beam direction in the shared RF spectrum band. In some examples, channel reservation component 1120 may transmit a fifth CR signal indicating the second reserved time period to a third UE 115 before transmitting the second CR signal and determine that a response to the fifth CR signal was not received during a designated time period, where transmitting the second CR signal is based on the determination. In some examples, channel reservation component 1120 may transmit a sixth CR signal to a third UE 115, where the sixth CR signal indicates a start time of a reserved time period and an end time of the reserved time period, and where the start time is different from a transmission time of the sixth CR signal. In some cases, the first CR signal and the second CR signal are transmitted in a same burst before receiving the third CR signal and the fourth CR signal. In some cases, the third CR signal is received before transmitting the fifth CR signal. In some cases, the fifth CR signal is transmitted in a same burst as the first CR signal before receiving the third CR signal. In some cases, the transmitting the sixth CR signal, the receiving the seventh CR signal, the communicating with the third UE 115 in the shared RF spectrum band, or any combination thereof is based on directional transmission using a beam direction to or from the third UE 115. In some cases, the shared RF spectrum band includes an unlicensed RF spectrum band that includes an mmW spectrum band.

Channel reservation response component 1125 may receive, in response to the first CR signal, a third CR signal indicating the first reserved time period from the first UE 115 using the first beam direction in the shared RF spectrum band and receive, in response to the second CR signal, a fourth CR signal indicating the second reserved time period from the second UE 115 using the second beam direction in the shared RF spectrum band. In some examples, channel reservation response component 1125 may receive a seventh CR signal from the third UE 115 in response to the sixth CR signal, where the seventh CR signal indicates the start time and the end time of the reserved time period. In some cases, the third CR signal and the fourth CR signal are received before communicating with the first UE 115 and the second UE 115. In some cases, the third CR signal is received before transmitting the second CR signal, where transmitting the second CR signal is based on the third CR signal. In some cases, the fourth CR signal is received before communicating with the first UE 115 and the second UE 115.

Channel reservation manager 1130 may identify a first end time of the first reserved time period, where the first CR signal, the third CR signal, or both include an indication of the first end time, and identify a second end time of the second CR signal, where the second CR signal, the fourth CR signal, or both include an indication of the second end time. Additionally or alternatively, channel reservation manager 1130 may identify a first start time of the first reserved time period, where the first CR signal, the third CR signal, or both include an indication of the first start time, and identify a second start time of the second reserved time period, where the second CR signal, the fourth CR signal, or both include an indication of the second start time, and where the first reserved time period is non-overlapping with the second reserved time period. In some cases, the first end time is different from the second end time and the first reserved time period is overlapping with the second reserved time period. In some cases, the first end time and the second end time include a same end time and the first reserved time period and the second reserved time period include a same time period. In some cases, the end time of the reserved time period is based on an end time for the communicating with the third UE 115. In some cases, the end time of the reserved time period is based on a time period for a set of UEs to communicate with a base station 105.

Resource grant component 1135 may transmit a resource grant for a downlink transmission to the first UE 115, the second UE 115, or both, where communicating with the first UE 115, the second UE 115, or both includes transmitting the downlink transmission using the resource grant, and where the method further includes receiving an acknowledgement from the first UE 115, the second UE 115, or both in response to the downlink transmission. In some examples, resource grant component 1135 may transmit a resource grant for an uplink transmission to the first UE 115, the second UE 115, or both, and communicate with the first UE 115, the second UE 115, or both includes receiving the uplink transmission based on the resource grant. In some cases, the first CR signal, the second CR signal, or both include a CR transmit signal, and the third CR signal, the fourth CR signal, or both include a CR receive signal. In some cases, the first CR signal, the second CR signal, or both include a CR receive signal and the third CR signal, the fourth CR signal, or both include a CR transmit signal.

LBT component 1140 may perform a first directional LBT procedure in the first beam direction, where the first CR signal is transmitted based on the first directional LBT procedure and perform a second directional LBT procedure in the second beam direction, where the second CR signal is transmitted based on the second directional LBT procedure.

Figure 12:
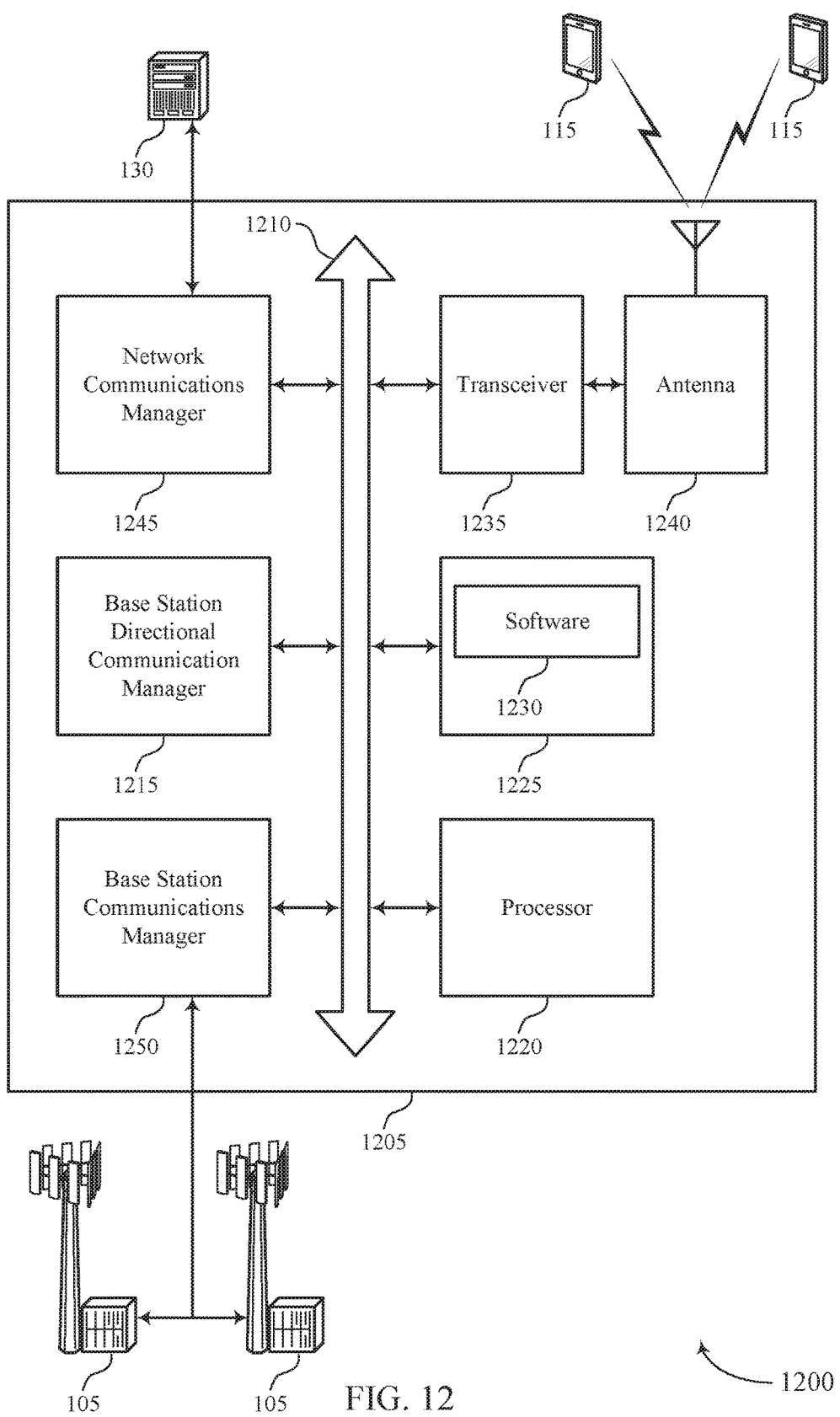
FIG. 12 illustrates a block diagram of a system including a base station that supports directional CR for TDM downlink and uplink data burst transmission in accordance with aspects of the present disclosure.

FIG. 12 shows a diagram of a system 1200 including a device 1205 that supports directional CR for TDM downlink and uplink data burst transmission in accordance with various aspects of the present disclosure. Device 1205 may be an example of or include the components of wireless device 905, wireless device 1005, or a base station 105 as described above, e.g., with reference to FIGS. 1, 9 and 10. Device 1205 may include components for bi-directional voice and data communications including components for transmitting and receiving communications, including base station directional communication manager 1215, processor 1220, memory 1225, software 1230, transceiver 1235, antenna 1240, network communications manager 1245, and base station communications manager 1250. These components may be in electronic communication via one or more busses (e.g., bus 1210). Device 1205 may communicate wirelessly with one or more UEs 115.

Some or all of the base station directional communication manager 1215, network communications manager 1245, and base station communications manager 1250 may be implemented in hardware, software executed by a processor, firmware, or any combination thereof. If implemented in software executed by a processor, the functions of the base station directional communication manager 1215, network communications manager 1245, and/or base station communications manager 1250 may be executed by a general-purpose processor, a DSP, an ASIC, an FPGA or other programmable logic device, discrete gate or transistor logic, discrete hardware components, or any combination thereof designed to perform the functions described in the present disclosure.

The base station directional communication manager 1215, network communications manager 1245, and/or base station communications manager 1250 may be physically located at various positions, including being distributed such that portions of functions are implemented at different physical locations by one or more physical devices. In some examples, the base station directional communication manager 1215, network communications manager 1245, and/or base station communications manager 1250 may be a separate and distinct component in accordance with various aspects of the present disclosure. In other examples, the base station directional communication manager 1215, network communications manager 1245, and/or base station communications manager 1250 may be combined with one or more other hardware components, including but not limited to a receiver, a transmitter, a transceiver, base station directional communication manager 1215, network communications manager 1245, base station communications manager 1250, processor 1220, memory 1225, transceiver 1235, antenna 1240, or another component or components in accordance with various aspects of the present disclosure.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting directional CR for TDM downlink and uplink data burst transmission).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware and/or software operation such as the interaction with peripheral components or devices.

Software 1230 may include code to implement aspects of the present disclosure, including code to support directional CR for TDM downlink and uplink data burst transmission. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Base station communications manager 1250 may manage communications with other base station 105, and may include a controller or scheduler for controlling communications with UEs 115 in cooperation with other base stations 105. For example, the base station communications manager 1250 may coordinate scheduling for transmissions to UEs 115 for various interference mitigation techniques such as beamforming or joint transmission. In some examples, base station communications manager 1250 may provide an X2 interface within an LTE/LTE-A wireless communication network technology to provide communication between base stations 105.

Figure 13:
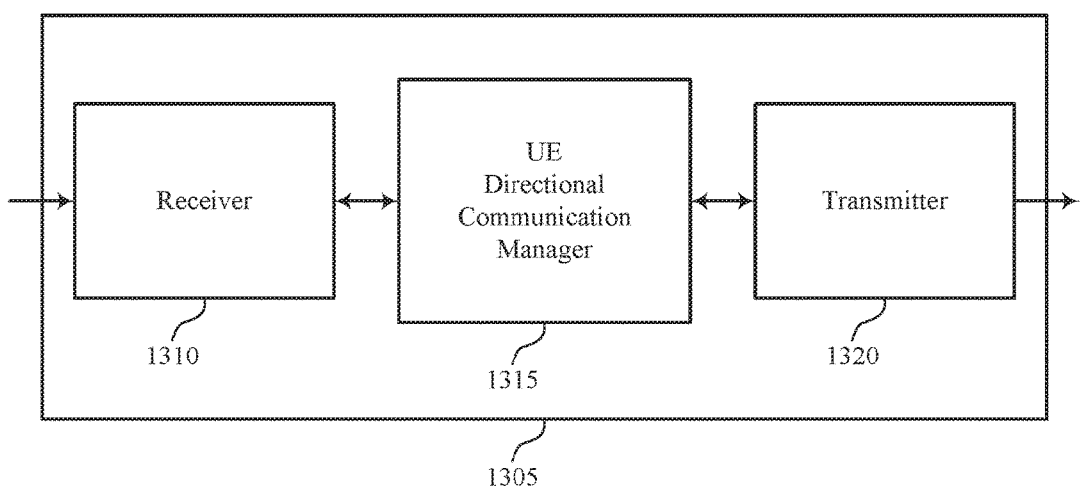
FIGS. 13 through 15 show block diagrams of a device that supports directional CR for TDM downlink and uplink data burst transmission in accordance with aspects of the present disclosure.

FIG. 13 shows a block diagram 1300 of a wireless device 1305 that supports directional CR for TDM downlink and uplink data burst transmission in accordance with various aspects of the present disclosure. Wireless device 1305 may be an example of aspects of a UE 115 as described with reference to FIG. 1. wireless device 1305 may include receiver 1310, UE directional communication manager 1315, and transmitter 1320. wireless device 1305 may also include a processor. Each of these components may be in communication with one another (e.g., via one or more buses).

Receiver 1310 may receive information such as packets, user data, or control information associated with various information channels (e.g., control channels, data channels, and information related to directional CR for TDM downlink and uplink data burst transmission, etc.). Information may be passed on to other components of the device. The receiver 1310 may be an example of aspects of the transceiver 1635 described with reference to FIG. 16.

UE directional communication manager 1315 may be an example of aspects of the UE directional communication manager 1615 described with reference to FIG. 16. UE directional communication manager 1315 and/or at least some of its various sub-components may be implemented in hardware, software executed by a processor, firmware, or any combination thereof. If implemented in software executed by a processor, the functions of the UE directional communication manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE directional communication manager 1315 and/or at least some of its various sub-components may be physically located at various positions, including being distributed such that portions of functions are implemented at different physical locations by one or more physical devices. In some examples, UE directional communication manager 1315 and/or at least some of its various sub-components may be a separate and distinct component in accordance with various aspects of the present disclosure. In other examples, UE directional communication manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE directional communication manager 1315 may receive a first CR signal from a base station 105 in a shared RF spectrum band, the first CR signal indicating a reserved time period and transmit, in response to receiving the first CR signal, a second CR signal indicating the reserved time period to the base station 105 in the shared RF spectrum band.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may include a single antenna, or it may include a set of antennas.

Transmitter 1320 may communicate with the base station 105 in the shared RF spectrum band during the reserved time period, where the communicating is based on the first CR signal and the second CR signal.

Figure 14:
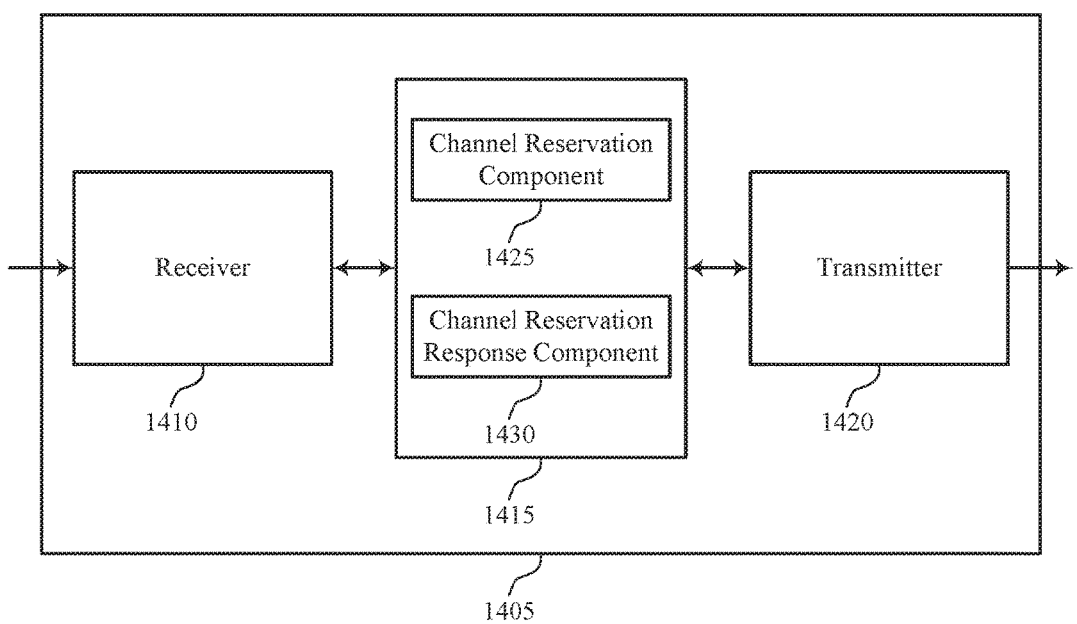

FIG. 14 shows a block diagram 1400 of a wireless device 1405 that supports directional CR for TDM downlink and uplink data burst transmission in accordance with various aspects of the present disclosure. Wireless device 1405 may be an example of aspects of a wireless device 1305 or a UE 115 as described with reference to FIGS. 1 and 13. wireless device 1405 may include receiver 1410, UE directional communication manager 1415, and transmitter 1420. wireless device 1405 may also include a processor. Each of these components may be in communication with one another (e.g., via one or more buses).

Receiver 1410 may receive information such as packets, user data, or control information associated with various information channels (e.g., control channels, data channels, and information related to directional CR for TDM downlink and uplink data burst transmission, etc.). Information may be passed on to other components of the device. The receiver 1410 may be an example of aspects of the transceiver 1635 described with reference to FIG. 16. UE directional communication manager 1415 may be an example of aspects of the UE directional communication manager 1615 described with reference to FIG. 16. UE directional communication manager 1415 may also include channel reservation component 1425 and channel reservation response component 1430.

The UE directional communication manager 1415 may be implemented in hardware, software executed by a processor, firmware, or any combination thereof. If implemented in software executed by a processor, the functions of the UE directional communication manager 1415 may be executed by a general-purpose processor, a DSP, an ASIC, an FPGA or other programmable logic device, discrete gate or transistor logic, discrete hardware components, or any combination thereof designed to perform the functions described in the present disclosure. The UE directional communication manager 1415 may be physically located at various positions, including being distributed such that portions of functions are implemented at different physical locations by one or more physical devices. In some examples, UE directional communication manager 1415 may be a separate and distinct component in accordance with various aspects of the present disclosure. In other examples, UE directional communication manager 1415 may be combined with one or more other hardware components, including but not limited to a receiver, a transmitter, a transceiver, or another component or components in accordance with various aspects of the present disclosure.

Channel reservation component 1425 may receive a first CR signal from a base station 105 in a shared RF spectrum band, the first CR signal indicating a reserved time period. In some cases, the receiving the first CR signal, the transmitting the second CR signal, the communicating with the base station 105, or any combination thereof is based on directional transmission using a beam direction to or from the base station 105.

Channel reservation response component 1430 may transmit, in response to receiving the first CR signal, a second CR signal indicating the reserved time period to the base station 105 in the shared RF spectrum band, transmit an acknowledgement for the first CR signal together with the second CR signal, and identify a delay period between receiving the first CR signal and transmitting the second CR signal, where the second CR signal is transmitted following the delay period. In some cases, the method further includes transmitting an acknowledgement to the base station 105 in response to the downlink transmission.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may include a single antenna, or it may include a set of antennas.

Figure 15:
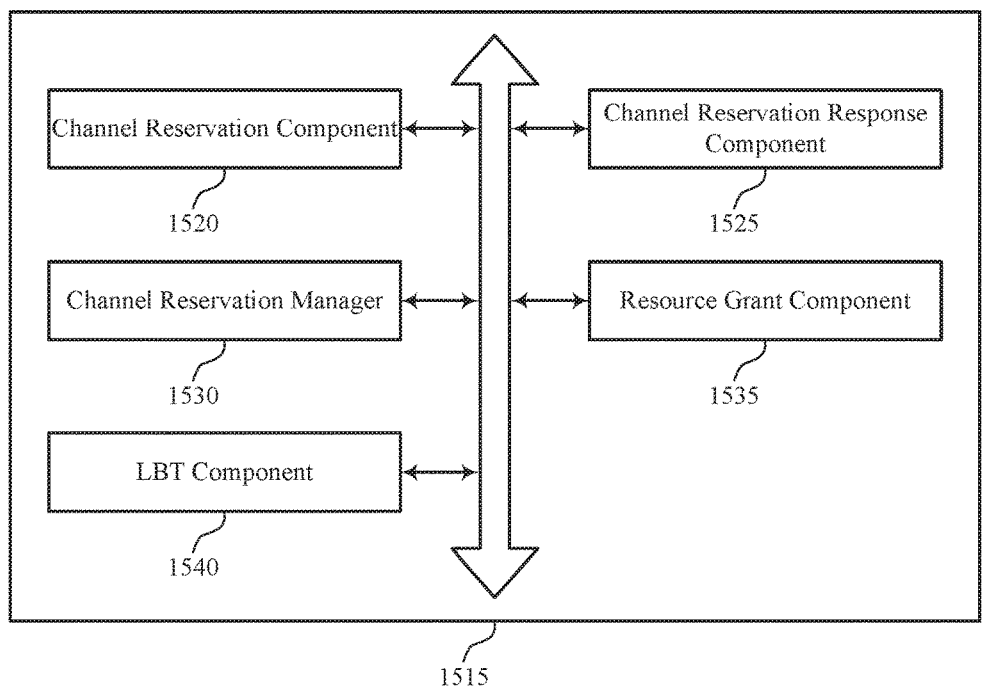

FIG. 15 shows a block diagram 1500 of a UE directional communication manager 1515 that supports directional channel reservation for TDM downlink and uplink data burst transmission in accordance with various aspects of the present disclosure. The UE directional communication manager 1515 may be an example of aspects of a UE directional communication manager 1615 described with reference to FIGS. 13, 14, and 16. The UE directional communication manager 1515 may include channel reservation component 1520, channel reservation response component 1525, channel reservation manager 1530, and resource grant component 1535. Each of these modules may communicate, directly or indirectly, with one another (e.g., via one or more buses).

The UE directional communication manager 1515 and/or channel reservation manager 1530 may be implemented in hardware, software executed by a processor, firmware, or any combination thereof. If implemented in software executed by a processor, the functions of the UE directional communication manager 1515 and/or channel reservation manager 1530 may be executed by a general-purpose processor, a DSP, an ASIC, an FPGA or other programmable logic device, discrete gate or transistor logic, discrete hardware components, or any combination thereof designed to perform the functions described in the present disclosure. The UE directional communication manager 1515 and/or channel reservation manager 1530 may be physically located at various positions, including being distributed such that portions of functions are implemented at different physical locations by one or more physical devices. In some examples, UE directional communication manager 1515 and/or channel reservation manager 1530 may be a separate and distinct component in accordance with various aspects of the present disclosure. In other examples, UE directional communication manager 1515 and/or channel reservation manager 1530 may be combined with one or more other hardware components, including but not limited to a receiver, a transmitter, a transceiver, or another component or components in accordance with various aspects of the present disclosure.

Channel reservation component 1520 may receive a first CR signal from a base station 105 in a shared RF spectrum band, the first CR signal indicating a reserved time period. In some cases, the receiving the first CR signal, the transmitting the second CR signal, the communicating with the base station, or any combination thereof is based on directional transmission using a beam direction to or from the base station 105.

Channel reservation response component 1525 may transmit, in response to receiving the first CR signal, a second CR signal indicating the reserved time period to the base station 105 in the shared RF spectrum band, transmit an acknowledgement for the first CR signal together with the second CR signal, and identify a delay period between receiving the first CR signal and transmitting the second CR signal, where the second CR signal is transmitted following the delay period. In some cases, the method further includes transmitting an acknowledgement to the base station 105 in response to the downlink transmission.

Channel reservation manager 1530 may identify an end time of the reserved time period based on the first CR signal, where the first CR signal, the second CR signal, or both include an indication of the end time and identify a start time of the reserved time period different from a transmission time of the first CR signal and a transmission time of the second CR signal, where the start time is identified based on the first CR signal, and where the first CR signal, the second CR signal, or both include an indication of the start time.

Resource grant component 1535 may receive a resource grant for a downlink transmission, where communicating with the base station 105 includes receiving the downlink transmission using the resource grant and receive a resource grant for an uplink transmission during the reserved time period, where communicating with the base station 105 includes transmitting the uplink transmission using the resource grant.

Figure 16:
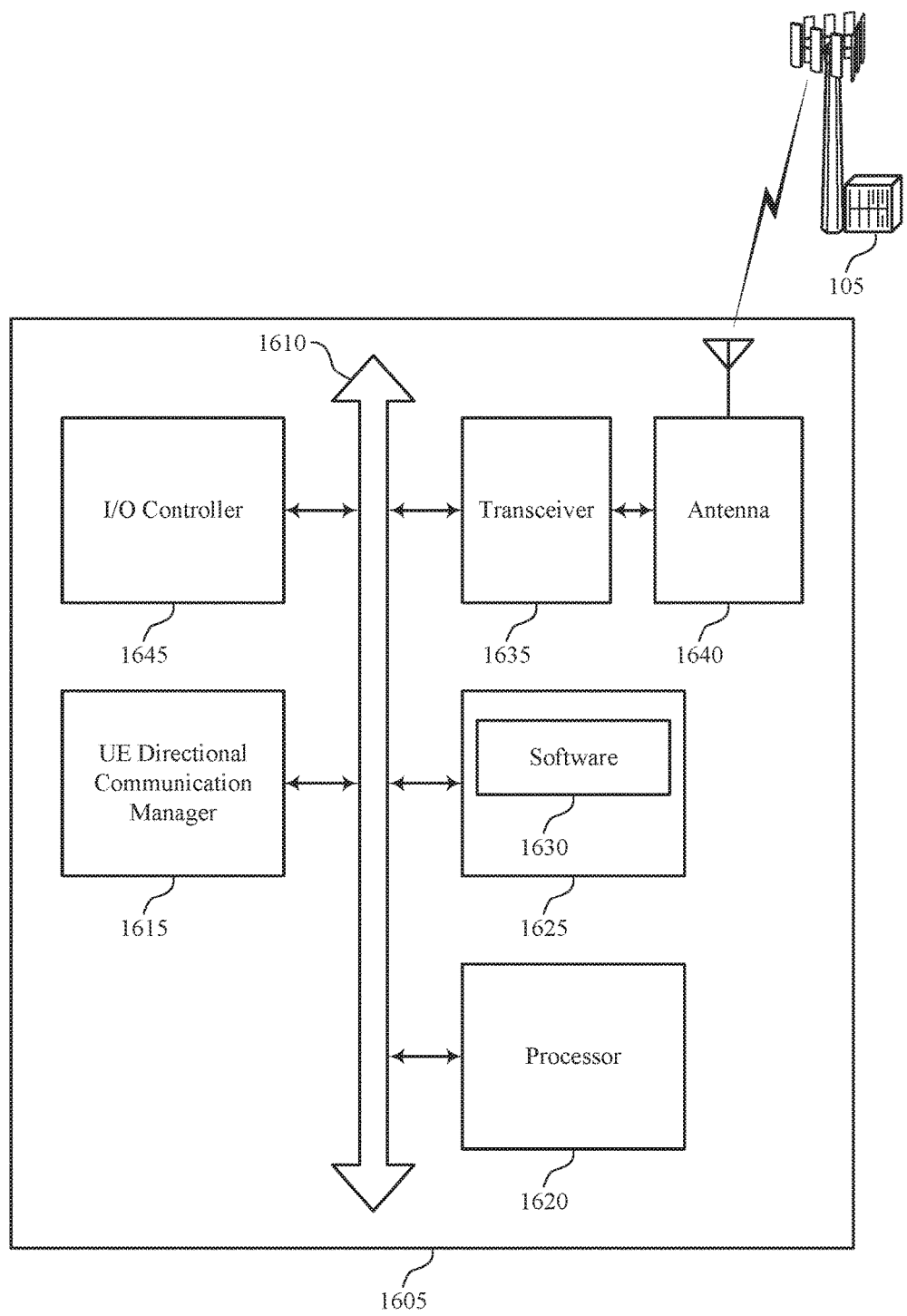
FIG. 16 illustrates a block diagram of a system including a UE that supports directional CR for TDM downlink and uplink data burst transmission in accordance with aspects of the present disclosure.

FIG. 16 shows a diagram of a system 1600 including a device 1605 that supports directional CR for TDM downlink and uplink data burst transmission in accordance with various aspects of the present disclosure. Device 1605 may be an example of or include the components of UE 115 as described above, e.g., with reference to FIG. 1. Device 1605 may include components for bi-directional voice and data communications including components for transmitting and receiving communications, including UE directional communication manager 1615, processor 1620, memory 1625, software 1630, transceiver 1635, antenna 1640, and I/O controller 1645. These components may be in electronic communication via one or more busses (e.g., bus 1610). Device 1605 may communicate wirelessly with one or more base stations 105.

The UE directional communication manager 1615 may be implemented in hardware, software executed by a processor, firmware, or any combination thereof. If implemented in software executed by a processor, the functions of the UE directional communication manager 1615 may be executed by a general-purpose processor, a DSP, an ASIC, an FPGA or other programmable logic device, discrete gate or transistor logic, discrete hardware components, or any combination thereof designed to perform the functions described in the present disclosure. The UE directional communication manager 1615 may be physically located at various positions, including being distributed such that portions of functions are implemented at different physical locations by one or more physical devices. In some examples, UE directional communication manager 1615 may be a separate and distinct component in accordance with various aspects of the present disclosure. In other examples, UE directional communication manager 1615 may be combined with one or more other hardware components, including but not limited to a receiver, a transmitter, a transceiver, a processor, an antenna, or another component or components in accordance with various aspects of the present disclosure.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting directional CR for TDM downlink and uplink data burst transmission).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware and/or software operation such as the interaction with peripheral components or devices.

Software 1630 may include code to implement aspects of the present disclosure, including code to support directional CR for TDM downlink and uplink data burst transmission. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

I/O controller 1645 may manage input and output signals for device 1605. I/O controller 1645 may also manage peripherals not integrated into device 1605. In some cases, I/O controller 1645 may represent a physical connection or port to an external peripheral. In some cases, I/O controller 1645 may utilize an operating system such as iOS®, ANDROID®, MS-DOS®, MS-WINDOWS®, OS/2®, UNIX®, LINUX®, or another known operating system. In other cases, I/O controller 1645 may represent or interact with a modem, a keyboard, a mouse, a touchscreen, or a similar device. In some cases, I/O controller 1645 may be implemented as part of a processor. In some cases, a user may interact with device 1605 via I/O controller 1645 or via hardware components controlled by I/O controller 1645.

Figure 17:
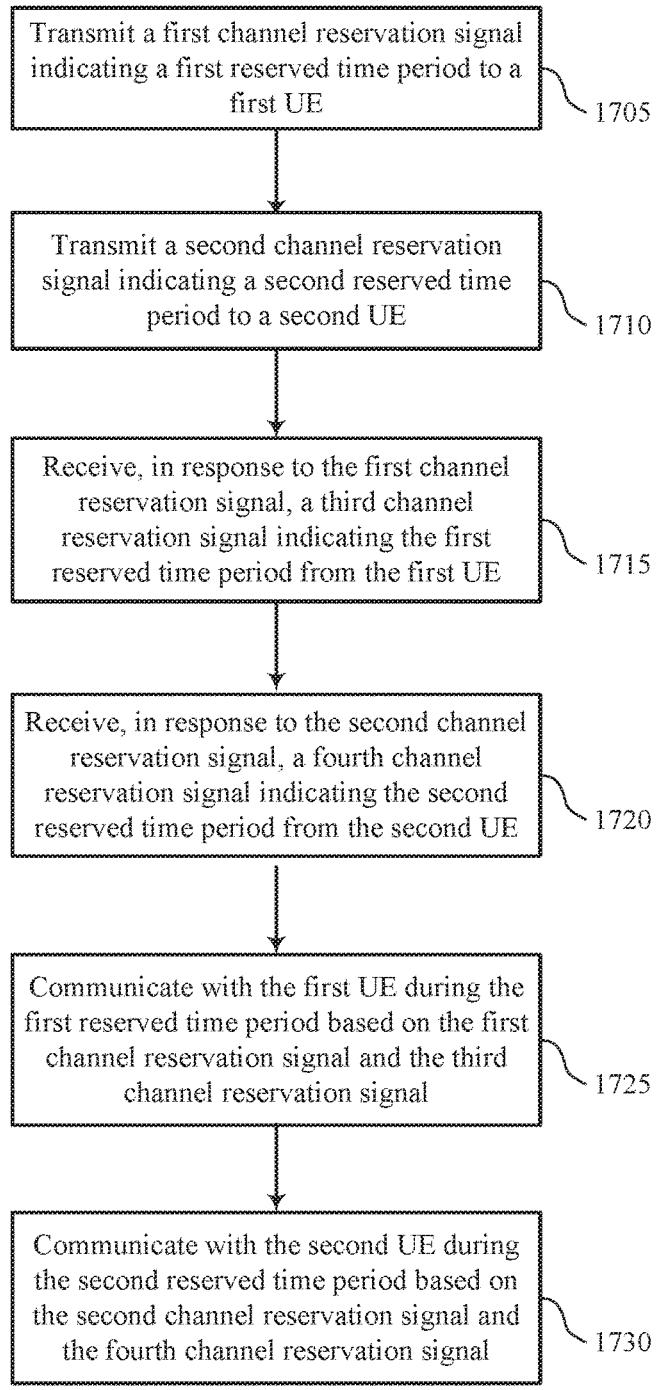
FIGS. 17 through 20 illustrate methods for directional CR for TDM downlink and uplink data burst transmission in accordance with aspects of the present disclosure.

FIG. 17 shows a flowchart illustrating a method 1700 for directional CR for TDM downlink and uplink data burst transmission in accordance with various aspects of the present disclosure. The operations of method 1700 may be implemented by a base station 105 or its components as described herein. For example, the operations of method 1700 may be performed by a base station directional communication manager as described with reference to FIGS. 9 through 12. In some examples, a base station 105 may execute a set of codes to control the functional elements of the device to perform the functions described below. Additionally or alternatively, the base station 105 may perform aspects the functions described below using special-purpose hardware.

At block 1705 the base station 105 may transmit a first CR signal indicating a first reserved time period to a first UE 115 using a first beam direction in a shared RF spectrum band. The operations of block 1705 may be performed according to the methods described with reference to FIGS. 1 through 8. In certain examples, aspects of the operations of block 1705 may be performed by a channel reservation component as described with reference to FIGS. 9 through 12.

At block 1710 the base station 105 may transmit a second CR signal indicating a second reserved time period to a second UE 115 using a second beam direction different from the first beam direction in the shared RF spectrum band. The operations of block 1710 may be performed according to the methods described with reference to FIGS. 1 through 8. In certain examples, aspects of the operations of block 1710 may be performed by a channel reservation component as described with reference to FIGS. 9 through 12.

At block 1715 the base station 105 may receive, in response to the first CR signal, a third CR signal indicating the first reserved time period from the first UE 115 using a first beam direction in the shared RF spectrum band. The operations of block 1715 may be performed according to the methods described with reference to FIGS. 1 through 8. In certain examples, aspects of the operations of block 1715 may be performed by a channel reservation response component as described with reference to FIGS. 9 through 12.

At block 1720 the base station 105 may receive, in response to the second CR signal, a fourth CR signal indicating the second reserved time period from the second UE 115 using the second beam direction in the shared RF spectrum band. The operations of block 1720 may be performed according to the methods described with reference to FIGS. 1 through 8. In certain examples, aspects of the operations of block 1720 may be performed by a channel reservation response component as described with reference to FIGS. 9 through 12.

At block 1725 the base station 105 may communicate with the first UE 115 using the first beam direction in the shared RF spectrum band during the first reserved time period based on the first CR signal and the third CR signal. The operations of block 1725 may be performed according to the methods described with reference to FIGS. 1 through 8. In certain examples, aspects of the operations of block 1725 may be performed by a transmitter as described with reference to FIGS. 9 through 12.

At block 1730 the base station 105 may communicate with the second UE 115 using the second beam direction in the shared RF spectrum band during the second reserved time period based on the second CR signal and the fourth CR signal. The operations of block 1730 may be performed according to the methods described with reference to FIGS. 1 through 8. In certain examples, aspects of the operations of block 1730 may be performed by a transmitter as described with reference to FIGS. 9 through 12.

Figure 18:
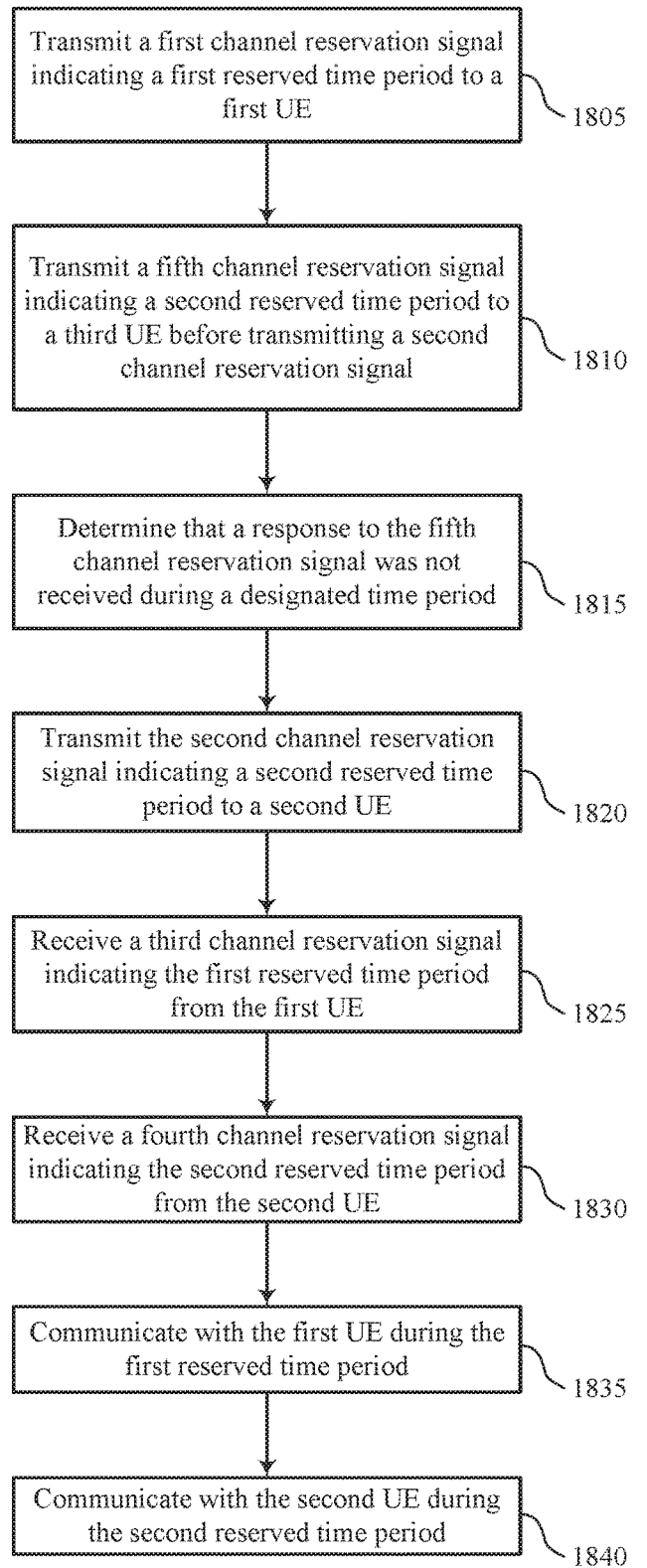

FIG. 18 shows a flowchart illustrating a method 1800 for directional CR for TDM downlink and uplink data burst transmission in accordance with various aspects of the present disclosure. The operations of method 1800 may be implemented by a base station 105 or its components as described herein. For example, the operations of method 1800 may be performed by a base station directional communication manager as described with reference to FIGS. 9 through 12. In some examples, a base station 105 may execute a set of codes to control the functional elements of the device to perform the functions described below. Additionally or alternatively, the base station 105 may perform aspects the functions described below using special-purpose hardware.

At block 1805 the base station 105 may transmit a first CR signal indicating a first reserved time period to a first UE 115 using a first beam direction in a shared RF spectrum band. The operations of block 1805 may be performed according to the methods described with reference to FIGS. 1 through 8. In certain examples, aspects of the operations of block 1805 may be performed by a channel reservation component as described with reference to FIGS. 9 through 12.

At block 1810 the base station 105 may transmit a fifth CR signal indicating the second reserved time period to a third UE 115 before transmitting the second CR signal. The operations of block 1810 may be performed according to the methods described with reference to FIGS. 1 through 8. In certain examples, aspects of the operations of block 1810 may be performed by a channel reservation component as described with reference to FIGS. 9 through 12.

At block 1815 the base station 105 may determine that a response to the fifth CR signal was not received during a designated time period, where transmitting the second CR signal is based on the determination. The operations of block 1815 may be performed according to the methods described with reference to FIGS. 1 through 8. In certain examples, aspects of the operations of block 1815 may be performed by a channel reservation component as described with reference to FIGS. 9 through 12.

At block 1820 the base station 105 may transmit a second CR signal indicating a second reserved time period to a second UE 115 using a second beam direction different from the first beam direction in the shared RF spectrum band. The operations of block 1820 may be performed according to the methods described with reference to FIGS. 1 through 8. In certain examples, aspects of the operations of block 1820 may be performed by a channel reservation component as described with reference to FIGS. 9 through 12.

At block 1825 the base station 105 may receive, in response to the first CR signal, a third CR signal indicating the first reserved time period from the first UE 115 using the first beam direction in the shared RF spectrum band. The operations of block 1825 may be performed according to the methods described with reference to FIGS. 1 through 8. In certain examples, aspects of the operations of block 1825 may be performed by a channel reservation response component as described with reference to FIGS. 9 through 12.

At block 1830 the base station 105 may receive, in response to the second CR signal, a fourth CR signal indicating the second reserved time period from the second UE 115 using the second beam direction in the shared RF spectrum band. The operations of block 1830 may be performed according to the methods described with reference to FIGS. 1 through 8. In certain examples, aspects of the operations of block 1830 may be performed by a channel reservation response component as described with reference to FIGS. 9 through 12.

At block 1835 the base station 105 may communicate with the first UE 115 using the first beam direction in the shared RF spectrum band during the first reserved time period based on the first CR signal and the third CR signal. The operations of block 1835 may be performed according to the methods described with reference to FIGS. 1 through 8. In certain examples, aspects of the operations of block 1835 may be performed by a transmitter as described with reference to FIGS. 9 through 12.

At block 1840 the base station 105 may communicate with the second UE 115 using the second beam direction in the shared RF spectrum band during the second reserved time period based on the second CR signal and the fourth CR signal. The operations of block 1840 may be performed according to the methods described with reference to FIGS. 1 through 8. In certain examples, aspects of the operations of block 1840 may be performed by a transmitter as described with reference to FIGS. 9 through 12.

Figure 19:
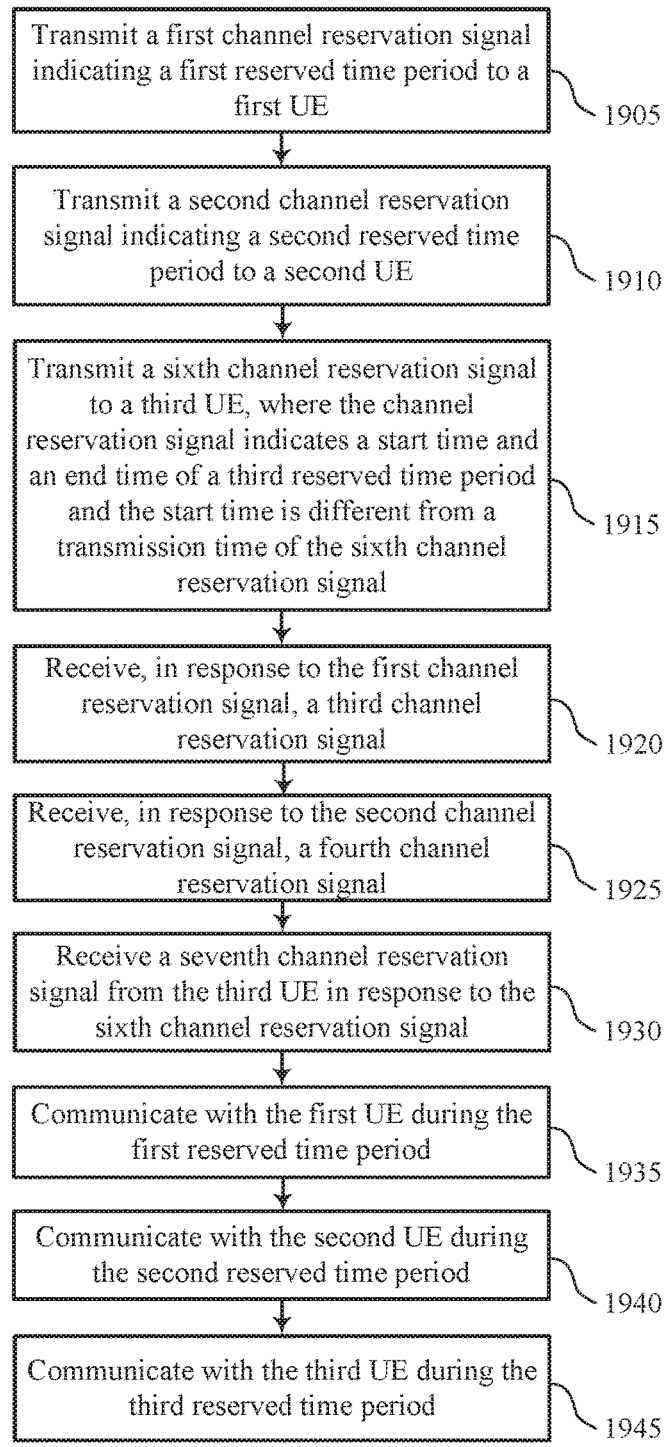

FIG. 19 shows a flowchart illustrating a method 1900 for directional CR for TDM downlink and uplink data burst transmission in accordance with various aspects of the present disclosure. The operations of method 1900 may be implemented by a base station 105 or its components as described herein. For example, the operations of method 1900 may be performed by a base station directional communication manager as described with reference to FIGS. 9 through 12. In some examples, a base station 105 may execute a set of codes to control the functional elements of the device to perform the functions described below. Additionally or alternatively, the base station 105 may perform aspects the functions described below using special-purpose hardware.

At block 1905 the base station 105 may transmit a first CR signal indicating a first reserved time period to a first UE 115 using a first beam direction in a shared RF spectrum band. The operations of block 1905 may be performed according to the methods described with reference to FIGS. 1 through 8. In certain examples, aspects of the operations of block 1905 may be performed by a channel reservation component as described with reference to FIGS. 9 through 12.

At block 1910 the base station 105 may transmit a second CR signal indicating a second reserved time period to a second UE 115 using a second beam direction different from the first beam direction in the shared RF spectrum band. The operations of block 1910 may be performed according to the methods described with reference to FIGS. 1 through 8. In certain examples, aspects of the operations of block 1910 may be performed by a channel reservation component as described with reference to FIGS. 9 through 12.

At block 1915 the base station 105 may transmit a sixth CR signal to a third UE 115, where the sixth CR signal indicates a start time of a third reserved time period and an end time of the third reserved time period, and where the start time is different from a transmission time of the sixth CR signal. The operations of block 1915 may be performed according to the methods described with reference to FIGS. 1 through 8. In certain examples, aspects of the operations of block 1915 may be performed by a channel reservation component as described with reference to FIGS. 9 through 12.

At block 1920 the base station 105 may receive, in response to the first CR signal, a third CR signal indicating the first reserved time period from the first UE 115 using the first beam direction in the shared RF spectrum band. The operations of block 1920 may be performed according to the methods described with reference to FIGS. 1 through 8. In certain examples, aspects of the operations of block 1920 may be performed by a channel reservation response component as described with reference to FIGS. 9 through 12.

At block 1925 the base station 105 may receive, in response to the second CR signal, a fourth CR signal indicating the second reserved time period from the second UE 115 using the second beam direction in the shared RF spectrum band. The operations of block 1925 may be performed according to the methods described with reference to FIGS. 1 through 8. In certain examples, aspects of the operations of block 1925 may be performed by a channel reservation response component as described with reference to FIGS. 9 through 12.

At block 1930 the base station 105 may receive a seventh CR signal from the third UE 115 in response to the sixth CR signal, where the seventh CR signal indicates the start time and the end time of the third reserved time period. The operations of block 1930 may be performed according to the methods described with reference to FIGS. 1 through 8. In certain examples, aspects of the operations of block 1930 may be performed by a channel reservation response component as described with reference to FIGS. 9 through 12.

At block 1935 the base station 105 may communicate with the first UE 115 using the first beam direction in the shared RF spectrum band during the first reserved time period based on the first CR signal and the third CR signal. The operations of block 1935 may be performed according to the methods described with reference to FIGS. 1 through 8. In certain examples, aspects of the operations of block 1935 may be performed by a transmitter as described with reference to FIGS. 9 through 12.

At block 1940 the base station 105 may communicate with the second UE 115 using the second beam direction in the shared RF spectrum band during the second reserved time period based on the second CR signal and the fourth CR signal. The operations of block 1940 may be performed according to the methods described with reference to FIGS. 1 through 8. In certain examples, aspects of the operations of block 1940 may be performed by a transmitter as described with reference to FIGS. 9 through 12.

At block 1945 the base station 105 may communicate with the third UE 115 in the shared RF spectrum band during the third reserved time period based at least in part on the sixth CR signal and the seventh CR signal. The operations of block 1945 may be performed according to the methods described with reference to FIGS. 1 through 8. In certain examples, aspects of the operations of block 1945 may be performed by a receiver as described with reference to FIGS. 9 through 12.

Figure 20:
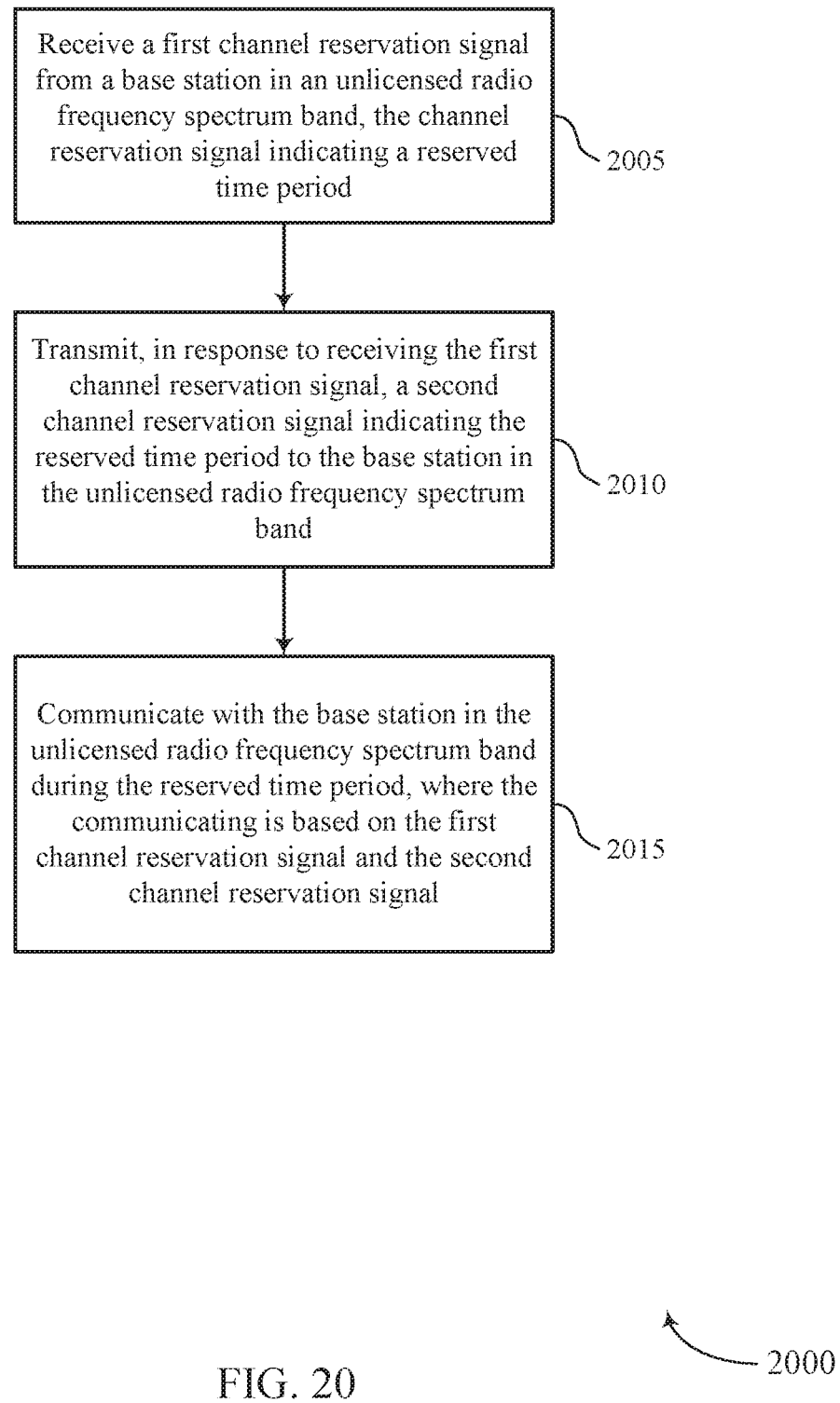

FIG. 20 shows a flowchart illustrating a method 2000 for directional CR for TDM downlink and uplink data burst transmission in accordance with various aspects of the present disclosure. The operations of method 2000 may be implemented by a UE 115 or its components as described herein. For example, the operations of method 2000 may be performed by a UE directional communication manager as described with reference to FIGS. 13 through 16. In some examples, a UE 115 may execute a set of codes to control the functional elements of the device to perform the functions described below. Additionally or alternatively, the UE 115 may perform aspects the functions described below using special-purpose hardware.

At block 2005 the UE 115 may receive a first CR signal from a base station 105 in a shared RF spectrum band, the CR signal indicating a reserved time period. The operations of block 2005 may be performed according to the methods described with reference to FIGS. 1 through 8. In certain examples, aspects of the operations of block 2005 may be performed by a channel reservation component as described with reference to FIGS. 13 through 16.

At block 2010 the UE 115 may transmit, in response to receiving the first CR signal, a second CR signal indicating the reserved time period to the base station 105 in the shared RF spectrum band. The operations of block 2010 may be performed according to the methods described with reference to FIGS. 1 through 8. In certain examples, aspects of the operations of block 2010 may be performed by a channel reservation response component as described with reference to FIGS. 13 through 16.

At block 2015 the UE 115 may communicate with the base station 105 in the shared RF spectrum band during the reserved time period, wherein the communicating is based at least in part on the first CR signal and the second CR signal. The operations of block 2015 may be performed according to the methods described with reference to FIGS. 1 through 8. In certain examples, aspects of the operations of block 2015 may be performed by a transmitter as described with reference to FIGS. 13 through 16.

In some examples, aspects from two or more of the methods 1700, 1800, 1900, or 2000 described with reference to FIG. 17, 18, 19 or 20 may be combined. It should be noted that the methods 1700, 1800, 1900, and 2000 are just example implementations, and that the operations of the methods 1700, 1800, 1900, or 2000 may be rearranged or otherwise modified such that other implementations are possible.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. A method for wireless communication, comprising:
transmitting a first channel reservation signal indicating a first reserved time period to a first user equipment (UE) using a first beam direction in a shared radio frequency spectrum band;
transmitting a second channel reservation signal indicating a second reserved time period to a second UE using a second beam direction different from the first beam direction in the shared radio frequency spectrum band, wherein the first channel reservation signal and the second channel reservation signal are transmitted in a same burst before receiving a third channel reservation signal and a fourth channel reservation signal;
receiving, in response to the first channel reservation signal, the third channel reservation signal indicating the first reserved time period from the first UE using the first beam direction in the shared radio frequency spectrum band;
receiving, in response to the second channel reservation signal, the fourth channel reservation signal indicating the second reserved time period from the second UE using the second beam direction in the shared radio frequency spectrum band;
communicating with the first UE using the first beam direction in the shared radio frequency spectrum band during the first reserved time period based at least in part on the first channel reservation signal and the third channel reservation signal; and
communicating with the second UE using the second beam direction in the shared radio frequency spectrum band during the second reserved time period based at least in part on the second channel reservation signal and the fourth channel reservation signal.

2. The method of claim 1, further comprising:
identifying a first end time of the first reserved time period, wherein the first channel reservation signal, the third channel reservation signal, or both include an indication of the first end time; and
identifying a second end time of the second channel reservation signal, wherein the second channel reservation signal, the fourth channel reservation signal, or both include an indication of the second end time.

3. The method of claim 2, further comprising:
identifying a first start time of the first reserved time period, wherein the first channel reservation signal, the third channel reservation signal, or both include an indication of the first start time; and
identifying a second start time of the second reserved time period, wherein the second channel reservation signal, the fourth channel reservation signal, or both include an indication of the second start time, and wherein the first reserved time period is non-overlapping with the second reserved time period.

4. The method of claim 2, wherein the first end time is different from the second end time and the first reserved time period is overlapping with the second reserved time period.

5. The method of claim 2, wherein the first end time and the second end time comprise a same end time and the first reserved time period and the second reserved time period comprise a same time period.

6. The method of claim 1, wherein
the third channel reservation signal and the fourth channel reservation signal are received before communicating with the first UE and the second UE.

7. The method of claim 1, wherein the shared radio frequency spectrum band comprises an unlicensed radio frequency spectrum band that includes a millimeter wave (mmW) spectrum band.

8. The method of claim 1, further comprising:
transmitting a fifth channel reservation signal indicating the second reserved time period to a third UE before transmitting the second channel reservation signal; and
determining that a response to the fifth channel reservation signal was not received during a designated time period, wherein transmitting the second channel reservation signal is based at least in part on the determination.

9. The method of claim 8, wherein the third channel reservation signal is received before transmitting the fifth channel reservation signal.

10. The method of claim 8, wherein the fifth channel reservation signal is transmitted in the same burst as the first channel reservation signal before receiving the third channel reservation signal.

11. The method of claim 1, further comprising:
transmitting a resource grant for a downlink transmission to the first UE, the second UE, or both, wherein communicating with the first UE, the second UE, or both comprises transmitting the downlink transmission using the resource grant, and
wherein the method further comprises receiving an acknowledgement from the first UE, the second UE, or both in response to the downlink transmission.

12. The method of claim 11, wherein the first channel reservation signal, the second channel reservation signal, or both comprise a channel reservation transmit signal, and the third channel reservation signal, the fourth channel reservation signal, or both comprise a channel reservation receive signal.

13. The method of claim 1, further comprising:
transmitting a resource grant for an uplink transmission to the first UE, the second UE, or both; and
communicating with the first UE, the second UE, or both comprises receiving the uplink transmission based on the resource grant.

14. The method of claim 13, wherein the first channel reservation signal, the second channel reservation signal, or both comprise a channel reservation receive signal and the third channel reservation signal, the fourth channel reservation signal, or both comprise a channel reservation transmit signal.

15. The method of claim 1, further comprising:
performing a first directional listen-before-talk (LBT) procedure in the first beam direction, wherein the first channel reservation signal is transmitted based at least in part on the first directional LBT procedure; and
performing a second directional LBT procedure in the second beam direction, wherein the second channel reservation signal is transmitted based at least in part on the second directional LBT procedure.

16. The method of claim 1, further comprising:
transmitting a sixth channel reservation signal to a third UE, wherein the sixth channel reservation signal indicates a start time of a third reserved time period and an end time of the third reserved time period, and wherein the start time is different from a transmission time of the sixth channel reservation signal;
receiving a seventh channel reservation signal from the third UE in response to the sixth channel reservation signal, wherein the seventh channel reservation signal indicates the start time and the end time of the third reserved time period; and
communicating with the third UE in the shared radio frequency spectrum band during the third reserved time period based at least in part on the sixth channel reservation signal and the seventh channel reservation signal.

17. The method of claim 16, wherein the transmitting the sixth channel reservation signal, the receiving the seventh channel reservation signal, the communicating with the third UE in the shared radio frequency spectrum band, or any combination thereof is based at least in part on directional transmission using a beam direction to or from the third UE.

18. The method of claim 16, wherein the end time of the third reserved time period is based at least in part on an end time for the communicating with the third UE.

19. The method of claim 16, wherein the end time of the third reserved time period is based at least in part on a time period for a plurality of UEs to communicate with a base station.

20. A method for wireless communication, comprising:
receiving a first channel reservation signal from a base station in a shared radio frequency spectrum band, the first channel reservation signal indicating a reserved time period;
identifying a delay period after receiving the first channel reservation signal and before transmitting a second channel reservation signal;
transmitting, in response to receiving the first channel reservation signal, Flail the second channel reservation signal indicating the reserved time period to the base station in the shared radio frequency spectrum band, wherein the second channel reservation signal is transmitted following the delay period; and communicating with the base station in the shared radio frequency spectrum band during the reserved time period, wherein the communicating is based at least in part on the first channel reservation signal and the second channel reservation signal.

21. The method of claim 20, further comprising:
transmitting an acknowledgement for the first channel reservation signal together with the second channel reservation signal.

22. The method of claim 20, wherein the receiving the first channel reservation signal, the transmitting the second channel reservation signal, the communicating with the base station, or any combination thereof is based at least in part on directional transmission using a beam direction to or from the base station.

23. The method of claim 20, further comprising:
identifying an end time of the reserved time period based at least in part on the first channel reservation signal, wherein the first channel reservation signal, the second channel reservation signal, or both include an indication of the end time.

24. The method of claim 23, further comprising:
identifying a start time of the reserved time period different from a transmission time of the first channel reservation signal and a transmission time of the second channel reservation signal, wherein the start time is identified based at least in part on the first channel reservation signal, and wherein the first channel reservation signal, the second channel reservation signal, or both include an indication of the start time.

25. The method of claim 20, further comprising:
receiving a resource grant for a downlink transmission, wherein communicating with the base station comprises receiving the downlink transmission using the resource grant; and
wherein the method further comprises transmitting an acknowledgement to the base station in response to the downlink transmission.

26. The method of claim 20, further comprising:
receiving a resource grant for an uplink transmission during the reserved time period, wherein communicating with the base station comprises transmitting the uplink transmission using the resource grant.

27. An apparatus for wireless communication, in a system comprising:
a processor;
memory in electronic communication with the processor; and
instructions stored in the memory and operable, when executed by the processor, to cause the apparatus to:
transmit a first channel reservation signal indicating a first reserved time period to a first user equipment (UE) using a first beam direction in a shared radio frequency spectrum band;

transmit a second channel reservation signal indicating a second reserved time period to a second UE using a second beam direction different from the first beam direction in the shared radio frequency spectrum band, wherein the first channel reservation signal and the second reservation signal are transmitted in a same burst before receiving a third channel reservation signal and a fourth channel reservation signal;

receive, in response to the first channel reservation signal, the third channel reservation signal indicating the first reserved time period from the first UE using the first beam direction in the shared radio frequency spectrum band;

receive, in response to the second channel reservation signal, the fourth channel reservation signal indicating the second reserved time period from the second UE using the second beam direction in the shared radio frequency spectrum band;

communicate with the first UE using the first beam direction in the shared radio frequency spectrum band during the first reserved time period based at least in part on the first channel reservation signal and the third channel reservation signal; and communicate with the second UE using the second beam direction in the shared radio frequency spectrum band during the second reserved time period based at least in part on the second channel reservation signal and the fourth channel reservation signal.

28. An apparatus for wireless communication, in a system comprising:
a processor;
memory in electronic communication with the processor; and
instructions stored in the memory and operable, when executed by the processor, to cause the apparatus to:
receive a first channel reservation signal from a base station in a shared radio frequency spectrum band, the first channel reservation signal indicating a reserved time period;
identify a delay period after receiving the first channel reservation signal and before transmitting a second channel reservation signal;
transmit, in response to receiving the first channel reservation signal, the second channel reservation signal indicating the reserved time period to the base station in the shared radio frequency spectrum band, wherein the second channel reservation signal is transmitted following the delay period; and
communicate with the base station in the shared radio frequency spectrum band during the reserved time period, wherein the communicating is based at least in part on the first channel reservation signal and the second channel reservation signal.

* * * * *

UNITED STATES PATENT AND TRADEMARK OFFICE
CERTIFICATE OF CORRECTION

PATENT NO. : 10,257,848 B2
APPLICATION NO. : 15/482511
DATED : April 9, 2019
INVENTOR(S) : Sun et al.

It is certified that error appears in the above-identified patent and that said Letters Patent is hereby corrected as shown below:

In the Claims

Column 42, Line 65 Claim 20: delete the word "Flail"

Signed and Sealed this
Twenty-first Day of May, 2019

Andrei Iancu
*Director of the United States Patent and Trademark Office*